United States Patent
Dyson et al.

(10) Patent No.: US 8,375,510 B2
(45) Date of Patent: *Feb. 19, 2013

(54) ATTACHMENT FOR A VACUUM CLEANING APPLIANCE

(75) Inventors: James Dyson, Malmesbury (GB); Giles Ashbee, Malmesbury (GB); Simon Edward Ireland, Malmesbury (GB); Emma Jane Heatley-Adams, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 289 days.

This patent is subject to a terminal disclaimer.

(21) Appl. No.: 12/775,105

(22) Filed: May 6, 2010

(65) Prior Publication Data

US 2010/0294209 A1 Nov. 25, 2010

(30) Foreign Application Priority Data

May 22, 2009 (GB) ................................. 0908845.1
Oct. 22, 2009 (GB) ................................. 0918553.9

(51) Int. Cl.
*A01M 1/06* (2006.01)
(52) U.S. Cl. ............. 15/402; 15/369; 15/415.1; 15/422
(58) Field of Classification Search .................. 15/402, 15/369, 415.1, 422
See application file for complete search history.

(56) References Cited

U.S. PATENT DOCUMENTS

| 2,648,867 | A |   | 8/1953 | Erling |  |
|---|---|---|---|---|---|
| 3,308,500 | A | * | 3/1967 | Woodruff | .......................... 15/369 |
| 5,502,873 | A |   | 4/1996 | Hogan |  |
| 5,768,748 | A | * | 6/1998 | Silvera et al. | .................... 15/402 |
| 6,681,775 | B2 |   | 1/2004 | Wang |  |
| 7,159,274 | B2 |   | 1/2007 | Freidell |  |
| 8,082,887 | B2 | * | 12/2011 | Fernandez | .................... 119/612 |
| 2002/0189049 | A1 |   | 12/2002 | Freidell |  |
| 2003/0172947 | A1 |   | 9/2003 | Wang |  |

(Continued)

FOREIGN PATENT DOCUMENTS

DE 203 13 203 11/2003
DE 20 2004 011 639 10/2004

(Continued)

OTHER PUBLICATIONS

International Search Report and Written Opinion mailed Mar. 8, 2011, directed to corresponding International Patent Application No. PCT/GB2010/050709; 12 pages.

(Continued)

*Primary Examiner* — William Gilbert
*Assistant Examiner* — Alp Akbasli
(74) *Attorney, Agent, or Firm* — Morrison & Foerster LLP

(57) ABSTRACT

An attachment for a vacuum cleaning appliance includes a head and a handle connected to the head. The head includes a bristle carrier having a plurality of bristles, and a bristle cover having a plurality of apertures. A conduit is connectable to a vacuum cleaning appliance for conveying an air flow towards the appliance. The head includes a first suction opening of the conduit and the handle includes a second suction opening of the conduit. An actuator effects relative movement between the bristle carrier and the bristle cover from a stowed configuration in which the bristles are retracted relative to the bristle cover to a deployed configuration in which the bristles protrude from the bristle cover through the apertures.

17 Claims, 21 Drawing Sheets

U.S. PATENT DOCUMENTS

| | | |
|---|---|---|
| 2008/0301901 A1 | 12/2008 | Oh |
| 2010/0180398 A1* | 7/2010 | Casper ............................ 15/344 |
| 2010/0294207 A1 | 11/2010 | Dyson et al. |
| 2010/0294208 A1 | 11/2010 | Dyson et al. |
| 2010/0294210 A1 | 11/2010 | Dyson et al. |
| 2011/0030620 A1* | 2/2011 | Jouan ............................ 119/611 |

FOREIGN PATENT DOCUMENTS

| | | |
|---|---|---|
| DE | 10 2006 030 154 | 1/2008 |
| FR | 2 813 498 | 3/2002 |
| FR | 2 826 852 | 1/2003 |
| GB | 794594 | 5/1958 |
| GB | 2 243 765 | 11/1991 |
| JP | 62-184847 | 11/1987 |
| JP | 2-49620 | 2/1990 |
| JP | 7-39576 | 7/1995 |
| JP | 2008-167724 | 7/2008 |
| JP | 2009-66341 | 4/2009 |
| WO | WO-2008/000337 | 1/2008 |
| WO | WO-2009/144426 | 12/2009 |

OTHER PUBLICATIONS

GB Search Report dated Aug. 17, 2009, directed to-counterpart GB Application No. 0908845.1; 1 page.

GB Search Report dated Feb. 22, 2010, directed to counterpart GB Application No. 0918553.9; 1 page.

Dyson et al., U.S. Office Action mailed Jun. 6, 2012, directed to U.S. Appl. No. 12/775,227; 11 pages.

Dyson et al., U.S. Office Action mailed Jun. 7, 2012, directed to U.S. Appl. No. 12/775,159; 10 pages.

Dyson et al., U.S. Office Action mailed Jun. 5, 2012, directed to U.S. Appl. No. 12/775,163; 11 pages.

* cited by examiner

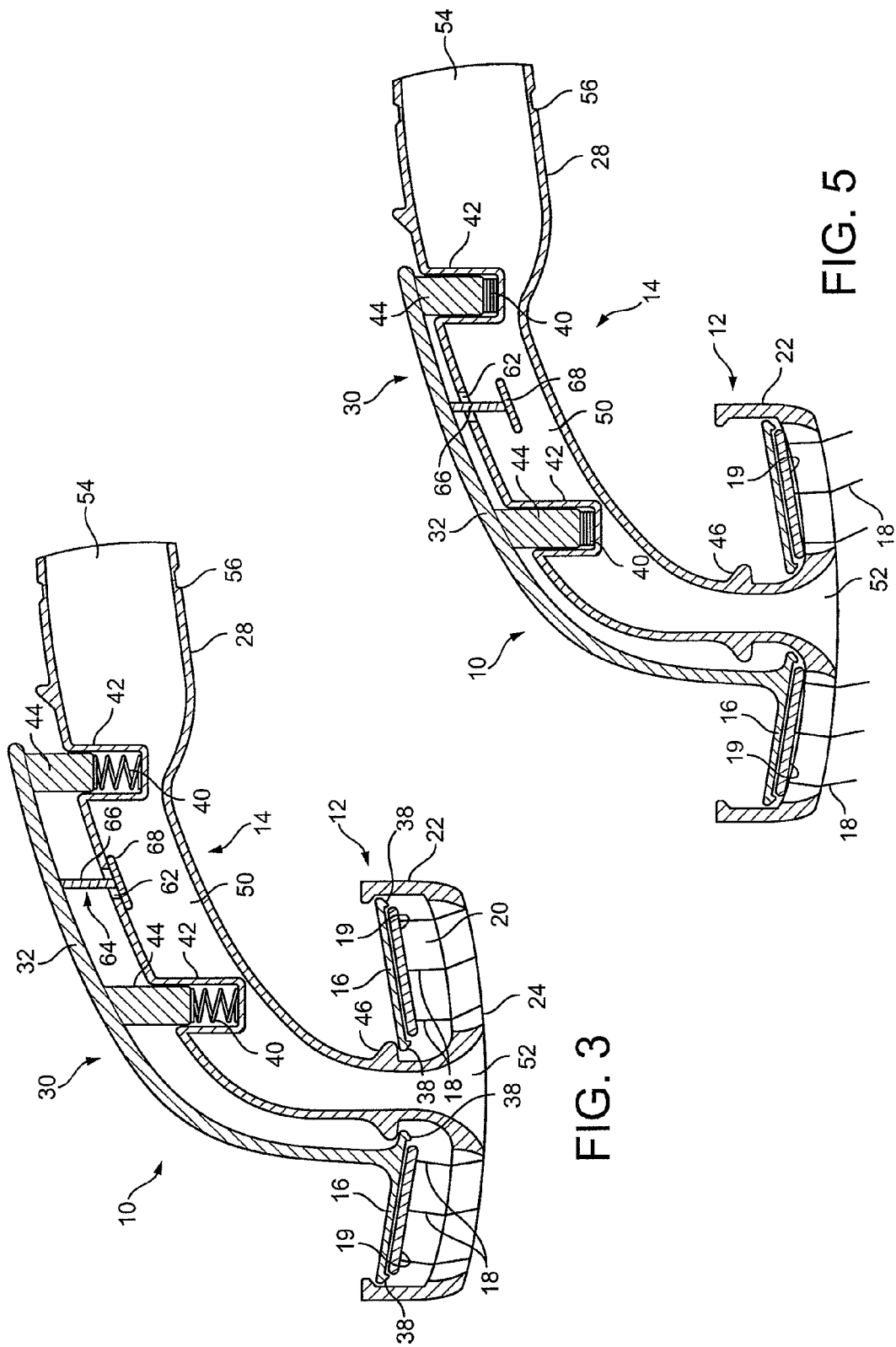

ATTACHMENT FOR A VACUUM CLEANING APPLIANCE

REFERENCE TO RELATED APPLICATIONS

This application claims the priority of United Kingdom Application No. 0908845.1, filed May 22, 2009, and United Kingdom Application No. 0918553.9, filed Oct. 22, 2009, the entire contents of which are incorporated herein by reference.

FIELD OF THE INVENTION

The present invention relates to a grooming device. In its preferred embodiment, the grooming device is in the form of an attachment for a vacuum cleaning appliance. The grooming device finds particular, but not exclusive, use as a pet grooming device.

BACKGROUND OF THE INVENTION

A conventional pet grooming device is a slicker brush, which comprises a grooming head attached to a handle. The head is usually in the form of a curved, generally rectangular bristle pad carrying an array of relatively fine metallic or polymeric bristles. A problem associated with slicker brushes is that hair removed from the pet by the slicker brush can become rapidly entangled between the bristles of the bristle pad. Consequently, a user may need to manually pull a mass of collected hair, together with any dander or other matter within the hair mass, from the bristle pad a number of times during grooming. Not only can this be an inconvenience for the user, but it can be unpleasant, particularly if the bristles are sharp or if the user is allergic to the matter removed from the pet.

In order to address this problem, it is known to provide brushes with retractable bristles. For example, U.S. Pat. No. 6,681,775 describes a brush having a handle and a bristle-receiving chamber connected to the handle. This chamber comprises a combing wall comprising a plurality of bristle-extension apertures, and a bristle pad comprising a plurality of bristles. The bristle pad is urged against the inner surface of the combing wall by a spring so that the bristles extend through the apertures. The bristle pad is connected to a lever which is rotatable about a pivot point against the biasing force of the spring to move the bristle pad away from the combing wall, thereby causing the bristles to retract within the chamber. This rotation may be effected by the thumb of the hand holding the brush, or by the other hand of the user. Hair or other matter entangled between the bristles will either fall from the brush as the bristles retract within the chamber or remain on the combing wall to be manually removed by the user. Once the combing wall has been cleaned the user releases the lever, resulting in the bristles being forced back through the apertures in the combing wall under the force of the spring.

SUMMARY OF THE INVENTION

The present invention provides an attachment for a vacuum cleaning appliance, comprising a head comprising a bristle carrier and a bristle cover, the bristle carrier comprising a plurality of bristles and the bristle cover comprising a plurality of apertures, a handle connected to the head, a conduit connectable to a vacuum cleaning appliance for conveying an air flow towards the appliance, and an actuator for effecting relative movement between the bristle carrier and the bristle cover between a deployed configuration, in which the bristles protrude from the bristle cover through the apertures, and a stowed configuration, in which the bristles are retracted relative to the bristle cover to dislodge hair collected between the bristles, wherein the head comprises a first suction opening of the conduit and the handle comprises a second suction opening of the conduit.

The retraction of the bristles relative to the bristle cover enables hair or other matter collected between the bristles of the bristle carrier to be readily dislodged from the bristles. This matter can become entrained within the air flow which is drawn into the conduit through the first suction opening, and so conveyed away from the bristle cover without the user having to brush or physically dislodge that matter from the bristle cover.

The first suction opening may be in the form of an aperture located in the bristle cover of the head. The first suction opening may be located centrally on the bristle cover. The bristle cover may comprise a first section of the conduit for conveying the air flow away from the bristle cover, and the handle may comprise a second section of the conduit for conveying the air flow towards an appliance connected to the handle. The second section of the conduit preferably extends from a first end to a second end of the handle.

The second suction opening is preferably located between the ends of the handle, more preferably above the head to allow hair and other airborne matter dislodged from the pet during the grooming operation to become entrained within the air flow and drawn through the second suction opening into the conduit. In one embodiment the second suction opening is in the form of an aperture located on a front surface of the handle, whereas in another embodiment the second suction opening is in the form of an aperture located on an upper surface of the handle.

When the head is in its deployed configuration it is preferable to have a relatively low air flow into the first suction opening in order to prevent the head from being pushed down against the skin of the pet being groomed, while allowing airborne hairs, dirt and other detritus to be drawn into the conduit through the second suction opening. Conversely, when the head is in its stowed configuration it is preferable to have a relatively high air flow into the first suction opening in order to draw the collected hair into the conduit. In view of this, the attachment preferably comprises means for varying the air flow through the suction openings depending on the configuration of the bristle carrier and the bristle cover.

The actuator may comprise the means for varying the air flow into the second suction opening. In one embodiment the actuator comprises a window for exposing at least part of the second suction opening when the head is in its deployed configuration, and means for substantially closing the second suction opening when the head is in its stowed configuration. For example, the actuator may be shaped to cover the second suction opening when the head is in its stowed configuration.

As another alternative, the conduit may comprise a third section which is arranged to convey the air flow from the second suction opening to the second section of the conduit. The third section of the conduit is preferably located in front of the second section of the conduit, and is more preferably substantially linearly aligned with the second section of the conduit. The second suction opening may be arranged at the end of this third section of the conduit, and may be arranged to face at least part of the bristle carrier. The periphery of the second suction opening may have a curvature which is substantially the same as the curvature of said at least part of the bristle carrier. When the bristle carrier is moveable relative to the bristle cover, the second suction opening may be arranged relative to the bristle carrier so that the bristle carrier varies the air flow into the second suction opening as the head moves between its stowed and deployed configurations. For example, the bristle carrier may be arranged to expose the second suction opening so that the air flow into the second suction opening is relatively high when the head is in the deployed configuration, and to reduce the air flow into the second suction opening when the head is in the stowed configuration. The bristle carrier may be arranged to at least partially close the second suction opening when the head is in the stowed configuration. The actuator may extend about the second section of the conduit.

Either the bristle cover or the bristle carrier may move relative to the other in response to operation of the actuator. In a preferred embodiment, the bristle carrier moves relative to the bristle cover in response to operation of the actuator to effect movement of the head from the stowed configuration to the deployed configuration.

The relative movement between the bristle carrier and the bristle cover may be effected in one of a number of different ways. For example, the actuator may be in the form of a button which is depressed by a user, and in response to which a motor or other electrical device is activated to cause, for example, the bristle carrier to move towards the bristle cover and cause the bristles to protrude through the apertures in the bristle cover. When the button is released, the motor is operated in reverse to retract the bristles. Instead of a button, a capacitive sensor or other form of sensor may be used to enable the actuator to be operated depending on the proximity of the finger, thumb or other part of the hand of the user to the sensor. As another alternative, a pneumatic system may be employed to effect relative movement between the bristle carrier and the bristle cover in response to operation of the actuator.

Preferably, the bristle carrier is mechanically connected to the actuator. The relative movement between the bristle carrier and the bristle cover may be effected by movement of the actuator relative to the handle. The actuator may be in the form of a slidable actuator which is operated by being slid relative to the handle by the user, for example using the thumb or other digit of a hand which is gripping the handle. The movement of the actuator relative to the handle, and thus the movement of the bristle carrier relative to the bristle cover, may be effected by sliding the actuator along the handle, or by pressing part of the actuator towards the handle. This can allow the user to effect the movement of the head between its stowed and deployed configurations by simply adjusting the force applied to the actuator using the thumb or other digit of a hand which is gripping the handle. Furthermore, the user is able to retract the bristles rapidly, either partially or fully, in the event that the bristles become caught or otherwise trapped in the fur of the pet during a grooming operation.

Alternatively, the actuator may comprise an arm located adjacent and extending alongside the handle, the handle and the arm being brought together when the attachment is gripped by a user to effect relative movement between the bristle carrier and the bristle cover.

The bristle carrier may be connected directly to the actuator. Alternatively, one or more other articulated or otherwise moveable connectors may be provided for connecting the bristle carrier to the actuator. The bristle cover of the head may be connected to the handle, or it may be integral therewith.

Preferably, the bristle carrier comprises a plurality of rows of bristles, and the bristle cover comprises a plurality of rows of apertures. Each aperture may be in the form of a slot through which a respective row of bristles protrudes as the head moves to its deployed configuration. The bristle cover may comprise a grooming wall in which the apertures are formed. Alternatively, the bristle cover may define a chamber for housing the bristle carrier, with the apertures being formed in a base of the bristle cover.

A valve arrangement may be provided for admitting air into the conduit in the event that there is a blockage in the suction opening, or immediately downstream from the suction opening, during use of the device. The valve arrangement preferably comprises an air bleed and means for controlling the air flow through the air bleed. The means for controlling the air flow through the air bleed may comprise a valve which is moveable between a closed position, in which there is substantially no air flow through the air bleed, and an open position depending on the magnitude of a pressure differential across the valve, that is, between the pressure of the air within the conduit and the pressure of the ambient atmosphere. A resilient element, preferably in the form of a helical spring, may be provided for urging the valve towards its closed position. For example, the valve may be urged against a valve seat by the resilient element so that there is substantially no air flow through the air bleed during normal use of the device. In the event of a blockage in the device upstream of the air bleed, the increase in the pressure differential between the air in the conduit and the ambient atmosphere can result in a force being applied to the valve which pushes the valve away from the valve seat, against the biasing force of the resilient element, to allow air to pass through the air bleed and into the conduit.

The handle preferably comprises a connector for connecting the conduit to an appliance for generating said air flow, for example a vacuum cleaning appliance. For example, the connector may be connectable to a hose for conveying the air flow into the appliance. As well as affording a large degree of manoeuvrability to the attachment during grooming, the use of a hose can enable the pet to be groomed in a room adjacent that in which appliance is located.

The attachment is preferably in the form of a pet grooming device.

BRIEF DESCRIPTION OF THE DRAWINGS

Embodiments of the present invention will now be described, by way of example only, with reference to the accompanying drawings, in which:

FIG. 3 is a simplified cross-sectional view of the grooming device of FIG. 1 with the head of the device in its stowed configuration;

FIG. 5 is a simplified cross-sectional view of the grooming device of FIG. 1 with the head of the device in its deployed configuration;

DETAILED DESCRIPTION OF THE DRAWINGS

Figure 1:
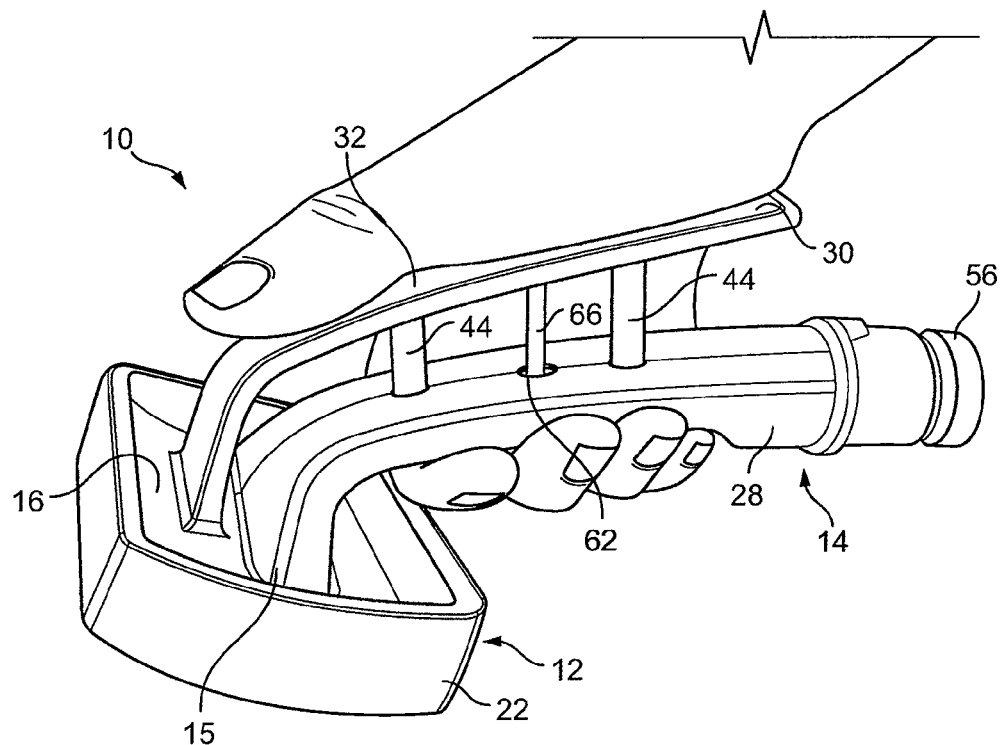
FIG. 1 is a side perspective view of a first embodiment of a grooming device when held by a user, and with the head of the device in a stowed configuration.
Figure 2:
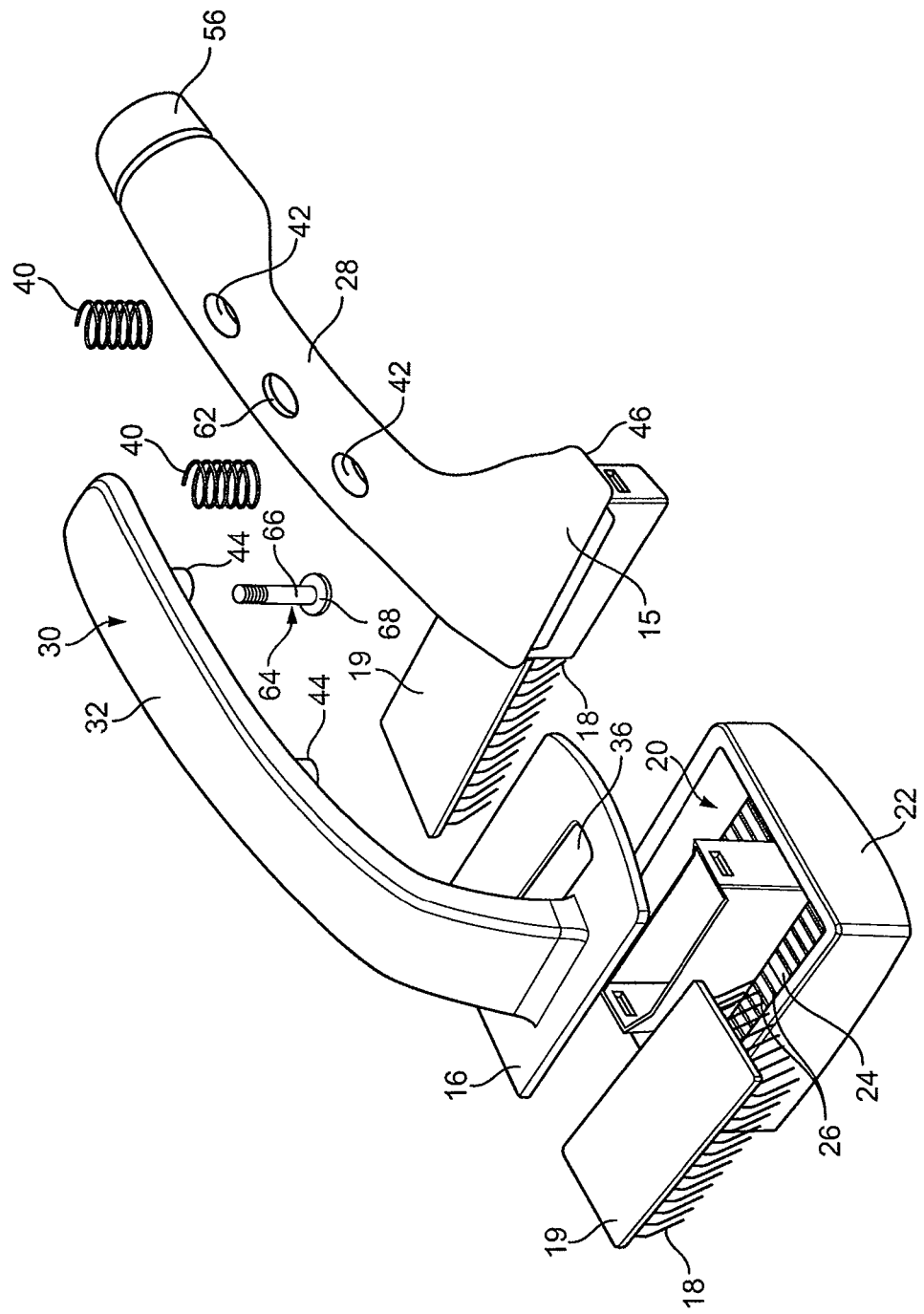
FIG. 2 is an exploded view of the grooming device of FIG. 1.

FIGS. 1 to 7 illustrate a first embodiment of a grooming device 10, which is in the form of an attachment for a vacuum cleaning appliance. With reference first to FIGS. 1 and 2, the grooming device 10 comprises a head 12 and a handle 14 having a first end 15 connected to the head 12.

The head 12 of the grooming device 10 comprises a bristle carrier 16 from which a plurality of rows of bristles 18 extend. In this embodiment, the bristles 18 are connected to pads 19 which are mounted on the bristle carrier 16. The pads 19 are housed within a bristle chamber 20. The bristle chamber 20 is defined, at least in part, by the bristle carrier 16 and a bristle cover 22. The bristle cover 22 comprises a base 24 having a plurality of rows of apertures 26 formed therein, and walls extending upwardly from the sides of the base 24. The base 24 is preferably convex in shape. The bristle carrier 16 substantially closes the upper (as illustrated) end of the bristle chamber 20. The handle 14 comprises a curved, elongate body 28.

The grooming device 10 comprises a manually operable actuator 30 for effecting relative movement between the bristle carrier 16 and the bristle cover 22. In a stowed configuration of the head 12, illustrated in FIGS. 1 and 3, the bristles 18 are retracted relative to the bristle cover 22 so as to be located substantially fully within the bristle chamber 20. In a deployed configuration of the head 12, illustrated in FIGS. 4 and 5, the bristles 18 protrude from the bristle cover 22 through the apertures 26 formed in the base 24 of the bristle cover 22.

The bristle cover 22 is connected to the first end 15 of the handle 14, whereas the bristle carrier 16 is connected to the actuator 30 so that movement of the actuator 30 relative to the body 28 causes the bristles 18 to move relative to the bristle cover 22. The bristle carrier 16 is preferably integral with the actuator 30. In this embodiment, the actuator 30 comprises an arm 32 located adjacent the body 28 of the handle 14, and which has a similar curvature to the body 28 of the handle 14. The bristle carrier 16 is connected to, or integral with, one end of the arm 32 of the actuator 30. The bristle carrier 16 comprises a centrally located aperture 36 through which the body 28 of the handle 14 passes, and two pairs of ribs 38. Each pair of ribs 38 is located on a respective side of the aperture 36 for receiving and retaining a respective bristle pad 19 therebetween.

The bristle carrier 16 is biased away from the base 24 of the bristle cover 22 so that the head 12 is normally in its stowed configuration. In this embodiment, the grooming device 10 comprises two resilient elements 40 in the form of helical compression springs which urge the arm 32 of the actuator 30 away from the body 28 of the handle 14, thereby urging the bristle carrier 16 away from the base 24. Each resilient element 40 is located within a cylindrical recess 42 formed in and spaced along the body 28 so that the recesses 42 are located opposite to the arm 32 of the actuator 30. The actuator 30 comprises two cylindrical rods 44 integral with and spaced along the arm 32 so that each rod 44 is aligned axially with a respective recess 42. The external diameter of the rods 44 is smaller than the internal diameter of the recesses 42 so that the rods 44 can enter the recesses 42 as the arm 32 is brought towards the body 28 of the handle 14. Each resilient element 40 is sized so that one end of the resilient element 40 engages the base of the recess 42, whereas the other end of the resilient element 40 engages the end of the rod 44 so as to urge the rod 44, and thus the actuator 30, away from the body 28 of the handle 14. The movement of the actuator 30 away from the body 28 is restricted by the abutment of the portion of the bristle carrier 16 surrounding the aperture 36 with an enlarged portion 46 of the body 28 of the handle 14, as illustrated in FIG. 3. The enlarged portion 46 of the body 28 is positioned along the body 28 so that when the bristle carrier 16 engages the enlarged portion 46 the bristles 18 are substantially fully retracted within the bristle chamber 20.

Figure 4:
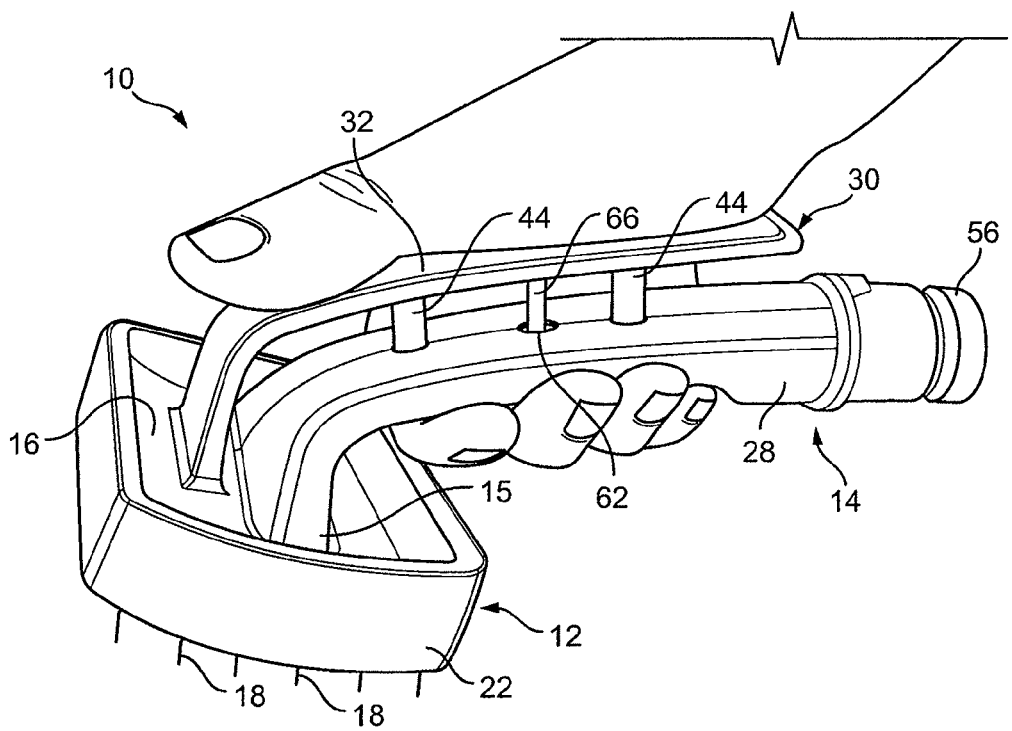
FIG. 4 is a side perspective view of the grooming device of FIG. 1 when gripped by the user, and with the head of the device in a deployed configuration.

With reference to FIGS. 1 and 4, when the grooming device 10 is held by the user the arm 32 of the actuator 30 is engaged by the thumb and thenar muscle of the hand, whereas the body 28 of the handle 14 is supported by the fingers of that hand. The actuator 30 is moved relative to the handle 14 by the user simply tightening its grip on the grooming device 10 to press the actuator 30 towards the handle 14 against the biasing force of the resilient elements 40. When the grooming device 10 is not in use the biasing force of the resilient elements 40 retains the head 12 of the grooming device 10 in its stowed configuration, in which the bristles 18 are substantially wholly located within the bristle chamber 20. This inhibits bristle damage, for example through accidental dropping of the grooming device 10 or its contact with other objects, when the grooming device 10 is not in use.

Figure 6:
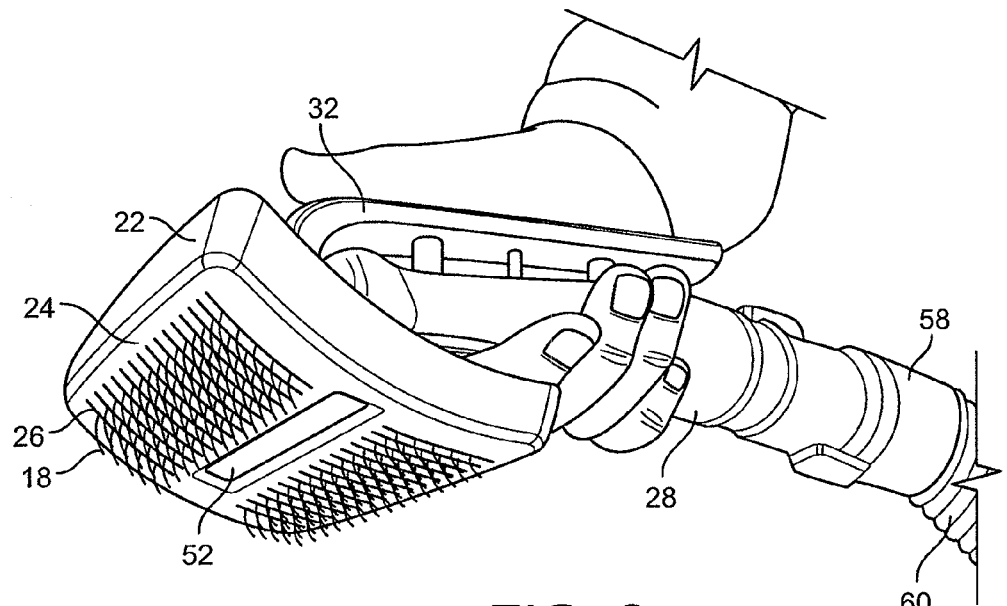
FIG. 6 is a front perspective view, from below, of the grooming device of FIG. 1 when the actuator is operated during a grooming operation.
Figure 7:
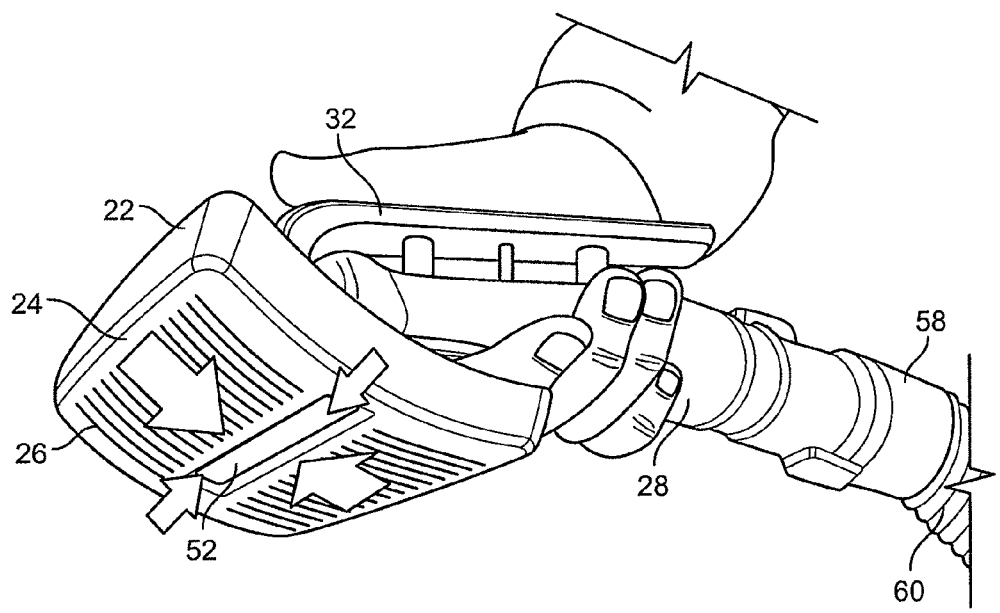
FIG. 7 is a front perspective view, from below, of the grooming device of FIG. 1 when the actuator is released during a grooming operation.

In this embodiment, the grooming device 10 comprises a conduit 50 for conveying an air flow away from the head 12 of the grooming device 10. The conduit 50 extends from a suction opening 52 located centrally in the base 24 of the bristle cover 22, through the body 28 of the handle 14 to a fluid outlet 54 located in a second end 56 of the handle 14 which is remote from the head 12. The second end 56 of the body 28 is connectable to an appliance for generating the air flow, such as a vacuum cleaner. With reference to FIGS. 6 and 7, the second end 56 of the body 28 is shaped to receive a connector 58 attached to a hose 60 for conveying the air flow to the appliance.

The grooming device 10 comprises means for varying the air flow into the conduit 50 from the suction opening 52. An air bleed 62 is located in the body 28 of the handle 14 for selectively admitting air into the conduit 50. The air bleed 62 may be conveniently located between the recesses 42 formed in the body 28. A valve 64 is connected to the side of the arm 32 facing the body 28 for movement with the actuator 30 to vary the air flow through the air bleed 62. The valve 64 comprises a valve body 66 which passes the air bleed 62, and a valve head 68 located within the conduit 50. The external diameter of the valve head 68 is greater than the internal diameter of the air bleed 62. The valve 64 is shaped so that the valve head 68 substantially closes the air bleed 62 when the head 12 is in its stowed configuration, as illustrated in FIG. 3. As the head 12 moves to its deployed configuration, as illustrated in FIG. 5, the valve head 68 moves away from the air bleed 62 to open the air bleed and thus decrease the air flow entering the conduit 50 through the suction opening 52.

With reference to FIGS. 6 and 7, in use the user connects the second end 56 of the body 28 of the handle 14 to a vacuum cleaner via the connector 58 and the hose 60, and switches on the appliance to create an air flow through the conduit 50. The user then grips the grooming device 10 to bring the body 28 and the actuator 30 together, which causes the head 12 to move to its deployed configuration. The bristle carrier 16 moves towards this base 24 of the bristle cover 22, which causes the bristles 18 to protrude from the bristle cover 22 through the apertures 26. While maintaining its grip on the device 10, the user may groom a pet by drawing the bristles 18 through the coat of the pet. As the air bleed 62 is open, the relatively low air flow entering the conduit 50 through the suction opening 52 enables loose hair, dirt and other matter to be entrained within the air flow passing through the suction opening 52 while preventing the head 12 from pushed down against the skin of the pet.

During grooming, hairs will be collected between the bristles 18 of the grooming device 10. In order to remove these hairs from the grooming device 10, the user releases the actuator 30 by relaxing its grip on the device 10, which enables the resilient elements 40 to urge the actuator 30 away from the body 28 of the handle 14. The head 12 returns to its stowed configuration. The bristle carrier 16 moves away from the base 24 of the bristle cover 22, which causes the bristles 18 to retract within the bristle chamber 20 and release the collected hairs from the bristles 18. The movement of the actuator 30 away from the body 28 of the handle 14 closes the air bleed 62 to increase the air flow through the suction opening 52, causing the collected hairs to be drawn into the conduit 50 through the suction opening 52 and carried away from the head 12 of the grooming device 10 without the user having to dislodge or other come into physical contact with the collected hairs.

In order to continue grooming, the user simply re-tightens its grip on the grooming device 10 to bring the body 28 and actuator 30 together again, resulting in the protrusion of the bristles 18 from the bristle cover 22. The user can periodically loosen its grip on the grooming device 10 to enable collected hairs to be removed from the head 12. Once the grooming has been completed, the user releases the device 10 and switches off the appliance. Hairs and other matter removed from the pet or otherwise collected during the grooming operation are retained within the appliance, for example in a bag or bin, for later disposal by the user.

FIGS. 8 to 15 illustrate a second embodiment of a grooming device 100, which is also in the form of an attachment for a vacuum cleaning appliance. With reference first to FIGS. 8 to 11, the grooming device 100 comprises a head 102 and a handle 104 having a first end 105 connected to the head 102. The head 102 of the grooming device 100 comprises a bristle carrier 106 from which a plurality of rows of bristles 108 extend. In this embodiment, the bristles 108 are connected to pads 109 (shown in FIG. 13) which are mounted on the bristle carrier 106. The head 102 further comprises a bristle cover 110 comprising a base 112 having a plurality of rows of apertures 114 formed therein, and walls extending upwardly from the sides of the base 112. The first end 105 of the handle 104 is connected to the bristle cover 110. The base 112 is preferably convex in shape.

The grooming device 100 comprises a manually operable actuator 116 for effecting relative movement between the bristle carrier 106 and the bristle cover 110. In a deployed configuration of the head 102, illustrated in FIGS. 8 to 13, the bristles 108 protrude from the bristle cover 110 through the apertures 114 formed in the base 112 of the bristle cover 110. In a stowed configuration of the head 102, illustrated in FIGS. 14 and 15, the bristles 108 are retracted relative to the bristle cover 110, preferably so that no part of the bristles 108 protrude from the bristle cover 110.

The bristle carrier 106 is connected to the actuator 116 so that movement of the actuator 116 relative to the handle 104 causes the bristle carrier 106 to move relative to the bristle cover 110. In this embodiment, the actuator 116 is located towards the front of the handle 104. The actuator 116 comprises an upper wall 118 extending over the front part of the upper surface 120 of the handle 104 and a front wall 124 located in front of the front surface 126 of the handle 104. The front wall 124 extends between the upper wall 118 and the bristle carrier 106, which preferably forms an integral part of the actuator 116.

Figure 12:
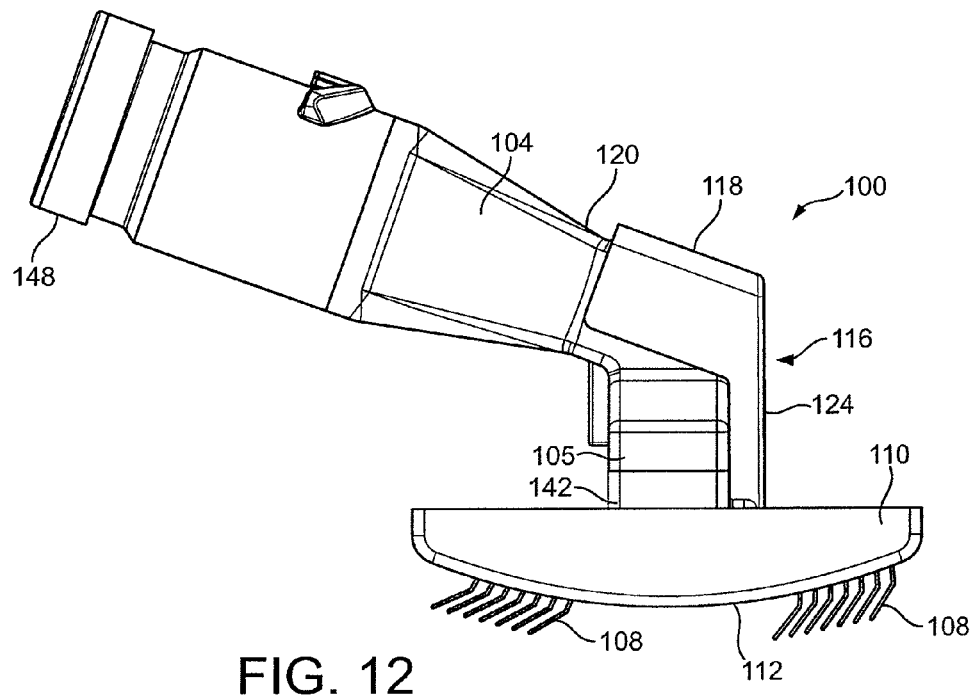
FIG. 12 is a side view of the grooming device of FIG. 8, with the head of the device in its deployed configuration.
Figure 13:
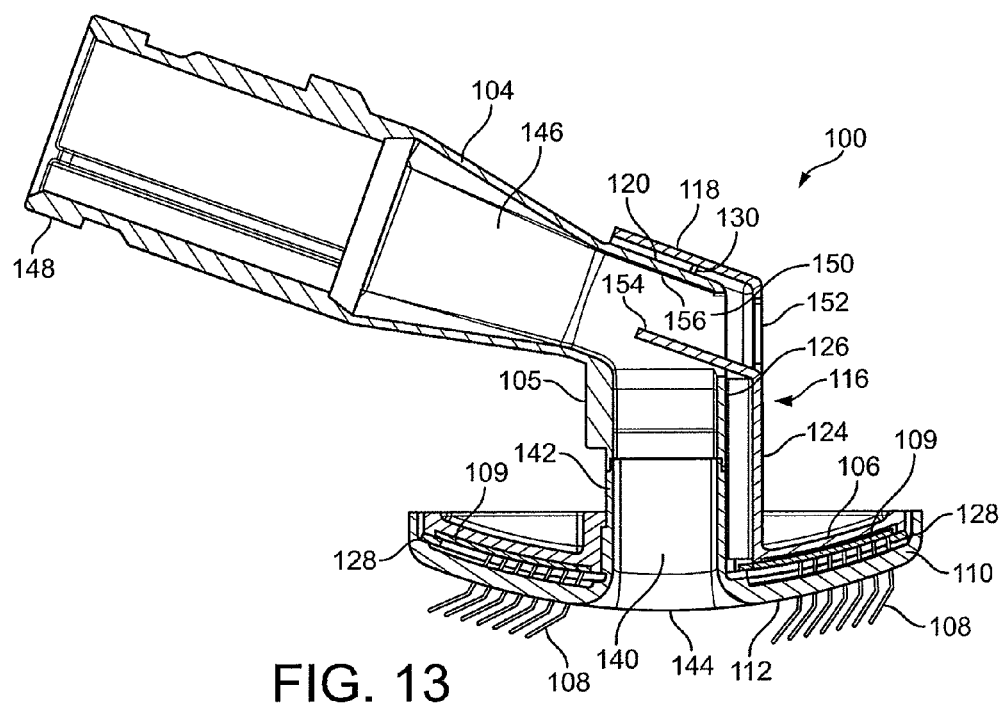
FIG. 13 is a side sectional view, taken along line A-A of FIG. 10, of the grooming device, with the head of the device in its deployed configuration.

The bristle pads 109 are mounted on the bristle carrier 106 by a frame 128 connected to the lower surface of the bristle carrier 106. As illustrated in FIGS. 12 and 13, the bristle carrier 106 is surrounded by the walls of the bristle cover 110 when the head 102 is in its deployed configuration.

Figure 14:
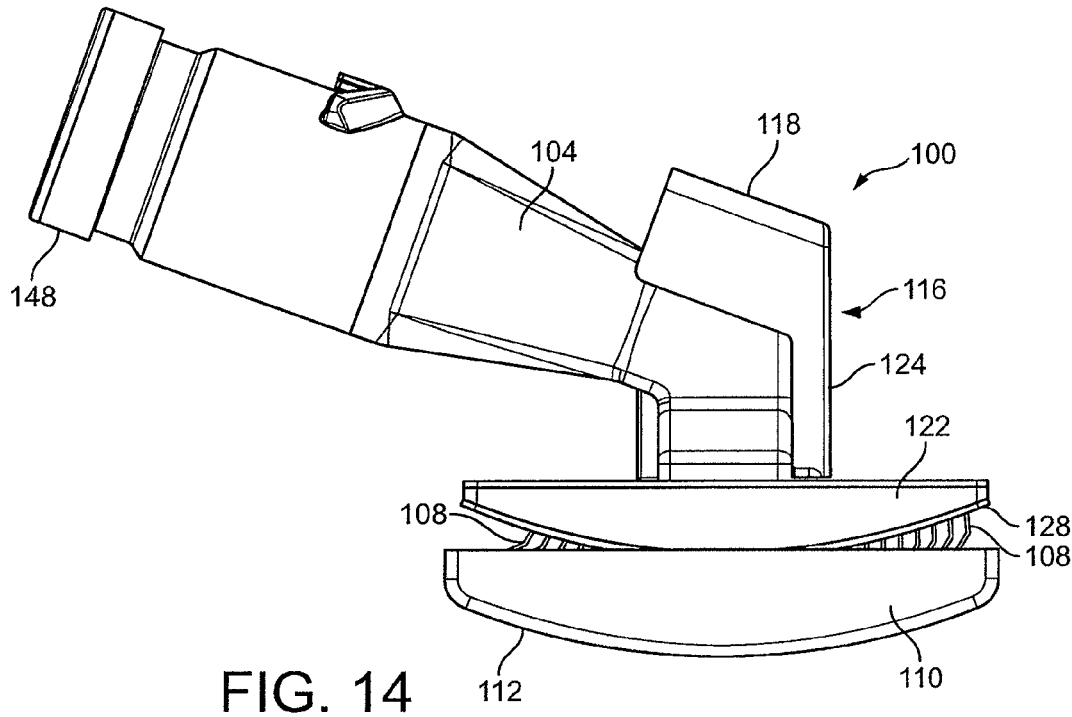
FIG. 14 is a side view of the grooming device of FIG. 8, with the head of the device in its stowed configuration.
Figure 15:
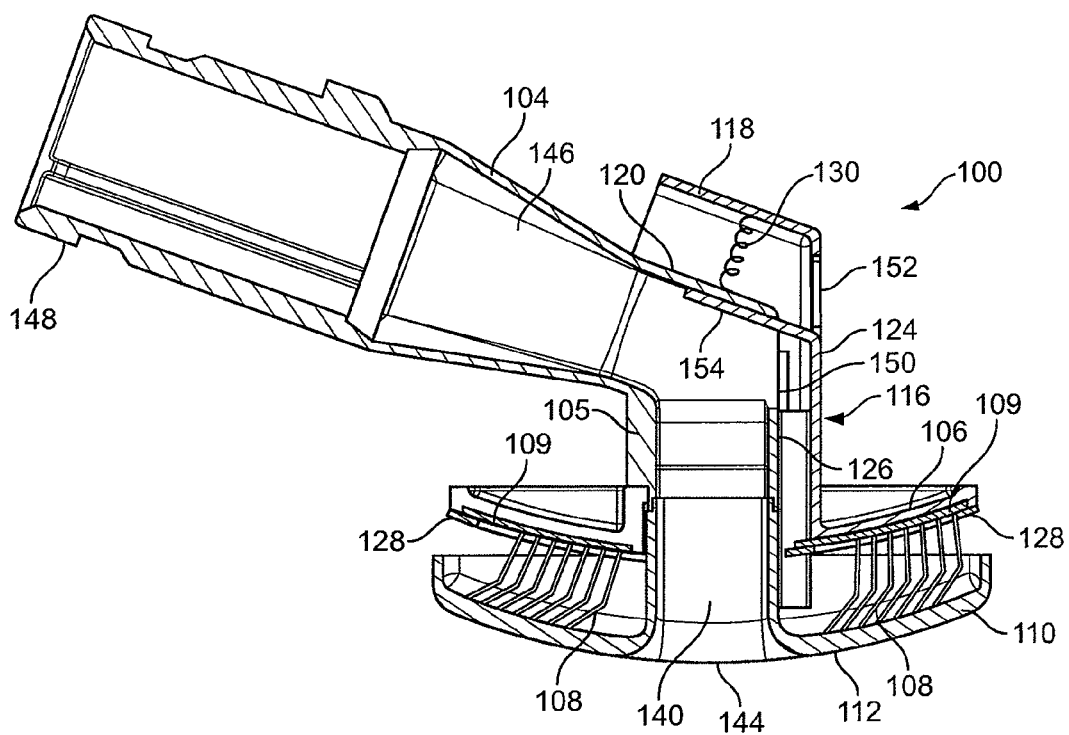
FIG. 15 is a side sectional view, taken along line A-A of FIG. 10, of the grooming device, with the head of the device in its stowed configuration.

As in the first embodiment, the bristle carrier 106 is biased away from the base 112 of the bristle cover 110 so that the head 102 is normally in its stowed configuration. In this second embodiment, the grooming device 100 comprises two resilient elements 130 in the form of helical compression springs which urge the upper wall 118 of the actuator 116 away from the upper surface 120 of the handle 104, thereby urging the bristle carrier 106 away from the base 112 of the bristle cover 110. As illustrated in FIGS. 14 and 15, when the grooming device 100 is not in use the biasing force of the resilient elements 130 retains the head 102 of the grooming device 100 in its stowed configuration. When the grooming device 100 is held by the user, the upper wall 118 of the actuator 116 is engaged by the thumb of the hand of the user and the handle 104 is supported by the fingers of that hand of the user. The actuator 116 is moved relative to the handle 104 by the user pressing the upper wall 118 of the actuator 116 towards the upper surface 120 of the handle 104 against the biasing force of the resilient elements 130. As illustrated in FIGS. 14 and 15, the base 122 of the actuator 116 is pushed towards the base 112 of the bristle cover 110, resulting in the protrusion of the bristles 108 through the apertures 114 of the bristle cover 110.

The grooming device 100 comprises a conduit for conveying an air flow away from the head 102 of the grooming device 100. A first section 140 of the conduit is defined by a duct 142 extending upwardly from a central portion from the base 112 of the bristle cover 110 and through an aperture formed in the bristle carrier 106. The lower end of duct 142 defines a first suction opening 144 in the base 112 of the bristle cover 110. The upper end of the duct 142 is connected to the first end 105 of the handle 104. A second section 146 of the conduit passes through the handle 104, from the first end 105 of the handle 104 to a second end 148 of the handle 104 which is remote from the head 102. The second end 148 of the handle 104 is connectable to an appliance for generating the air flow, such as a vacuum cleaner. As in the first embodiment, the second end 148 of the handle 104 is shaped to receive a connector attached to a hose for conveying the air flow to the appliance.

Figure 8:
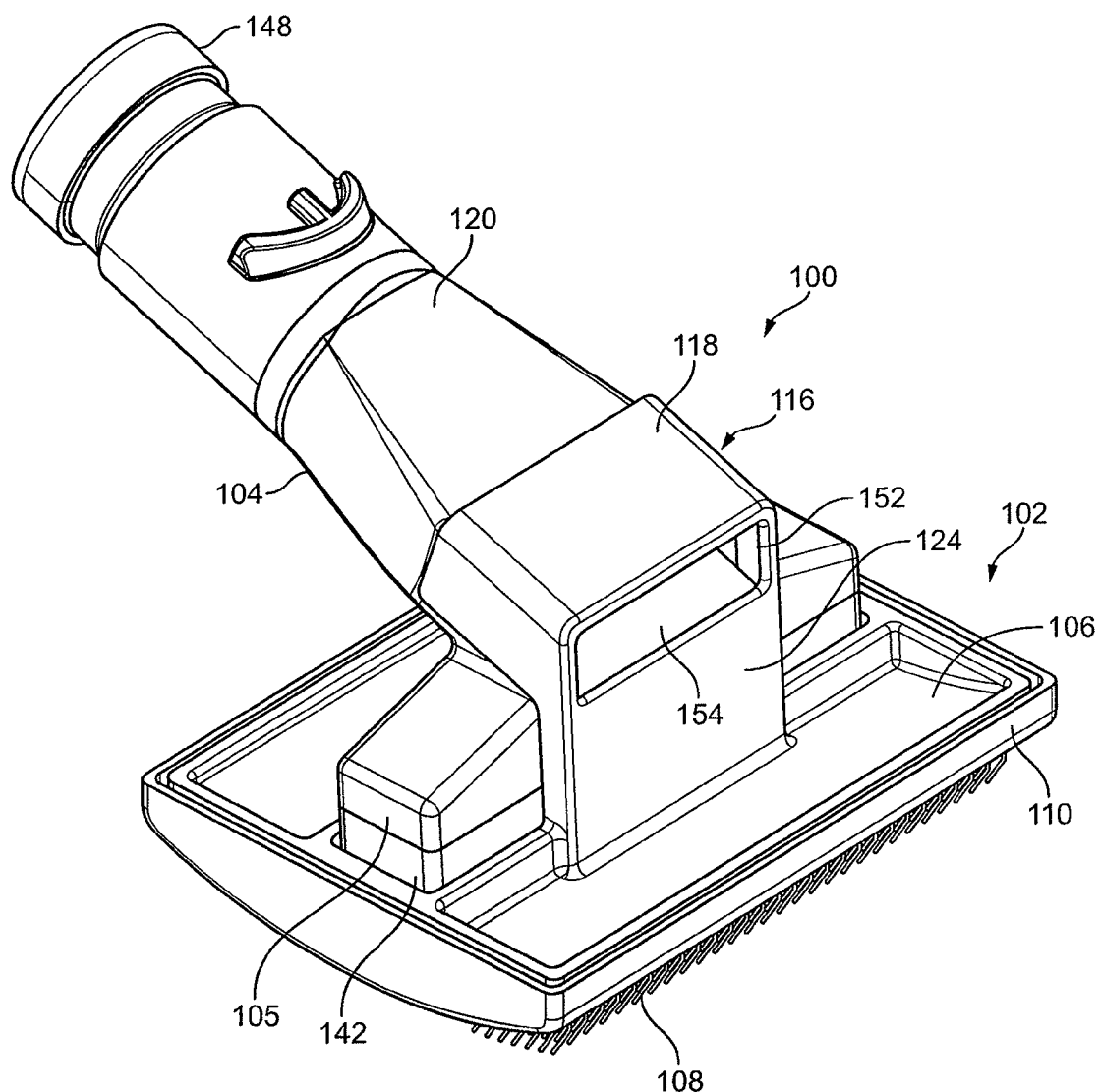
FIG. 8 is a front perspective view, from above, of a second embodiment of a grooming device, with the head of the device in a deployed configuration.
Figure 9:
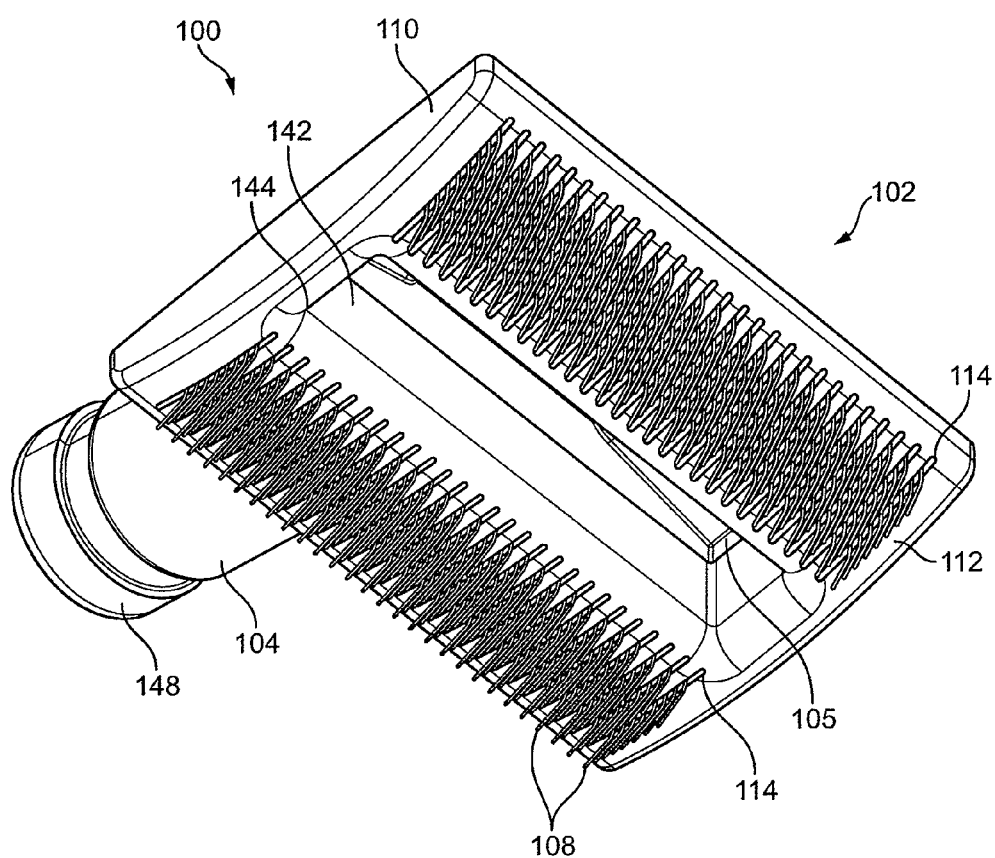
FIG. 9 is a front perspective view, from below, of the grooming device of FIG. 8, with the head in its deployed position.
Figure 10:
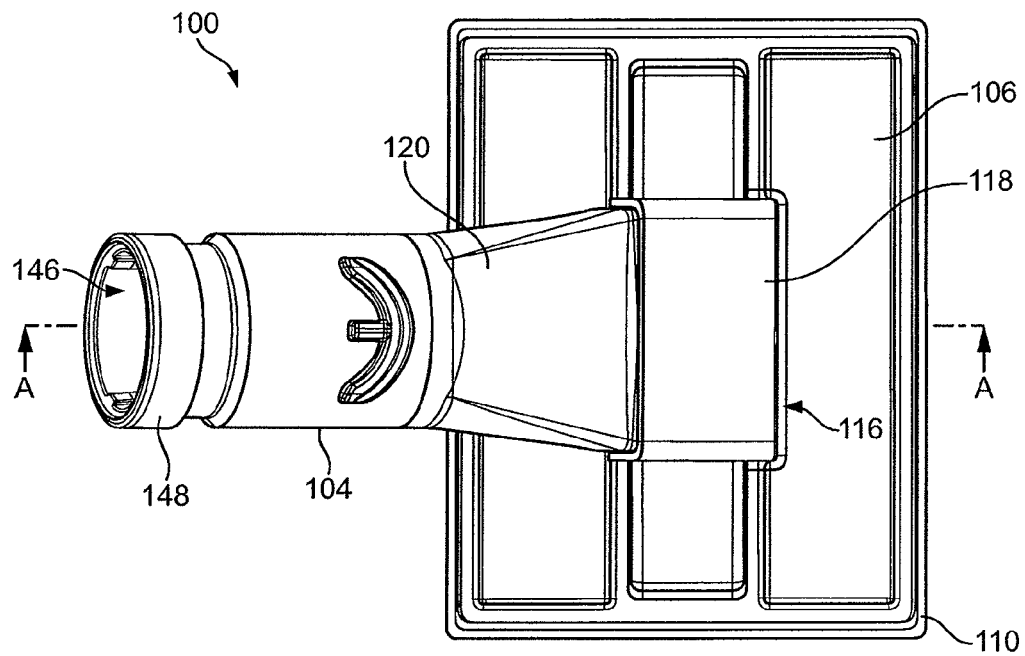
FIG. 10 is a top view of the grooming device of FIG. 8.
Figure 11:
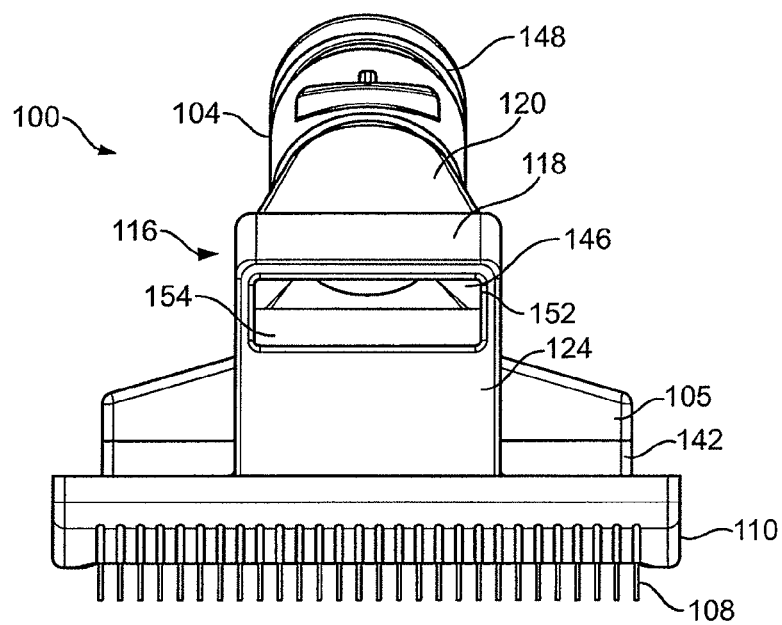
FIG. 11 is a front view of the grooming device of FIG. 8, with the head of the device in its deployed configuration.

The grooming device 100 also comprises means for varying the air flow into the conduit from the suction opening 144. In this embodiment an air bleed in the form of a second suction opening 150 formed in the front surface 126 of the handle 104 is provided for selectively admitting air into the second section 146 of the conduit. The air flow through the second suction opening 150 is varied by the actuator 116 as it is moved relative to the handle 104. As illustrated in FIG. 8, the actuator 116 comprises a window 152 formed in the front wall 122 thereof. With reference to FIG. 13, when the head 102 is in its deployed configuration the window 152 is in a lowered position in which substantially all of the second suction opening 150 is exposed by the window 152. Thus, the air bleed is open when the head 102 is in its deployed configuration. With reference to FIG. 15, when the head 102 is in its stowed configuration the window 152 is in a raised position in which the second suction opening 150 is covered by the front wall 124 of the actuator 116. Thus, the air bleed is substantially closed when the head 102 is in its stowed configuration. If desired, part of the second suction opening 150 may also be exposed by the window 152 when the head 102 is in its stowed configuration in order to restrict the air flow through the first suction opening 144.

The actuator 116 further comprises a guide vane 154 located beneath the window 152, and which extends through the second suction opening 150 and into the handle 104. As illustrated in FIGS. 13 and 15, the guide vane 154 is substantially parallel to the upper wall 118 of the actuator 116. The guide vane 154 serves to guide the airflow entering the grooming device 100 through the second suction opening 150 into the second section 146 of the conduit. The guide vane 154 also serves to restrict the movement of the actuator 116 away from the handle 104 through abutment with an inner surface 156 of the handle 104. The guide vane 154 is positioned on the actuator 116 so that when the guide vane 154 engages this inner surface 156 of the handle 104 the bristles 108 are substantially fully retracted through the apertures 114 of the bristle cover 110.

In use, the user connects the second end 148 of the handle 104 to a vacuum cleaner, and switches on the appliance to create an air flow through the conduit. The user then grips the handle 104 of the grooming device 100 and, using the thumb of the hand holding the grooming device 100, presses the upper wall 118 of the actuator 116 towards the handle 104. This causes the head 102 to move to its deployed configuration in which the bristles 108 protrude from the bristle cover 110 through the apertures 114. While continuing to depress the actuator 116, the user may groom a pet by drawing the bristles 108 through the coat of the pet. As the air bleed is open when the head 102 is in its deployed configuration, a first part of the air flow generated by the vacuum cleaner enters the conduit through the first suction opening 144. This enables loose hair, dirt and other matter to be entrained within the air flow passing through the first suction opening 144. A second part of the air flow generated by the vacuum cleaner enters the conduit through the second suction opening 150. This enables airborne hair and other matter to the entrained within the air flow passing the second suction opening 150. The relatively low air flow entering the conduit through the first suction opening 144 prevents the head 102 from being pushed down against the skin of the pet during the grooming operation.

During grooming, hairs will be collected between the bristles 108 of the grooming device 10. In order to remove these hairs from the grooming device 100, the user releases the actuator 116 by reducing the pressure applied to the upper wall 118 of the actuator 116. This enables the resilient elements 130 to urge the actuator 116 away from the handle 104. This in turn causes the bristles 108 to retract through the apertures 114 in the bristle cover 110 as the head 102 moves to its stowed configuration, thereby releasing the collected hairs from the bristles 108. The movement of the actuator 116 closes the air bleed to increase the amount of the air flow which enters the conduit through the first suction opening 144. This causes the collected hairs to be drawn into the conduit through the first suction opening 144 and carried away from the head 102 of the grooming device 100 without the user having to dislodge or other come into physical contact with the collected hairs.

In order to continue grooming, the user simply depresses the upper wall 118 of the actuator 116 again, resulting in the protrusion of the bristles 108 from the bristle cover 110. The user can periodically reduce the pressure applied to the upper wall 118 of the actuator 116 to enable collected hairs to be removed from the head 102.

FIGS. 16 to 25 illustrate a third embodiment of a grooming device 200, which is also in the form of an attachment for a vacuum cleaning appliance. The grooming device 200 comprises a head 202 and a handle 204 having a first end 205 connected to the head 202. The head 202 of the grooming device 200 comprises a bristle carrier 206 from which a plurality of rows of bristles 208 extend. Similar to the second embodiment, the bristles 208 are connected to pads 209 (shown in FIG. 22) which are mounted on the bristle carrier 206 by a frame 210 connected to the lower surface of the bristle carrier 206.

The head 202 further comprises a bristle cover 212 comprising a base 214 having a plurality of rows of apertures 216 formed therein. The first end 205 of the handle 204 is connected to the bristle cover 212. The base 214 is preferably convex in shape.

The grooming device 200 comprises a manually operable actuator 218 for effecting relative movement between the bristle carrier 206 and the bristle cover 212. In a stowed configuration of the head 202, illustrated in FIGS. 16 to 23, the bristles 208 are retracted relative to the bristle cover 212, preferably so that no part of the bristles 208 protrude from the bristle cover 212. In a deployed configuration of the head 202, illustrated in FIGS. 24 and 25, the bristles 208 protrude from the bristle cover 212 through the apertures 216 formed in the base 214 of the bristle cover 212.

Figure 16:
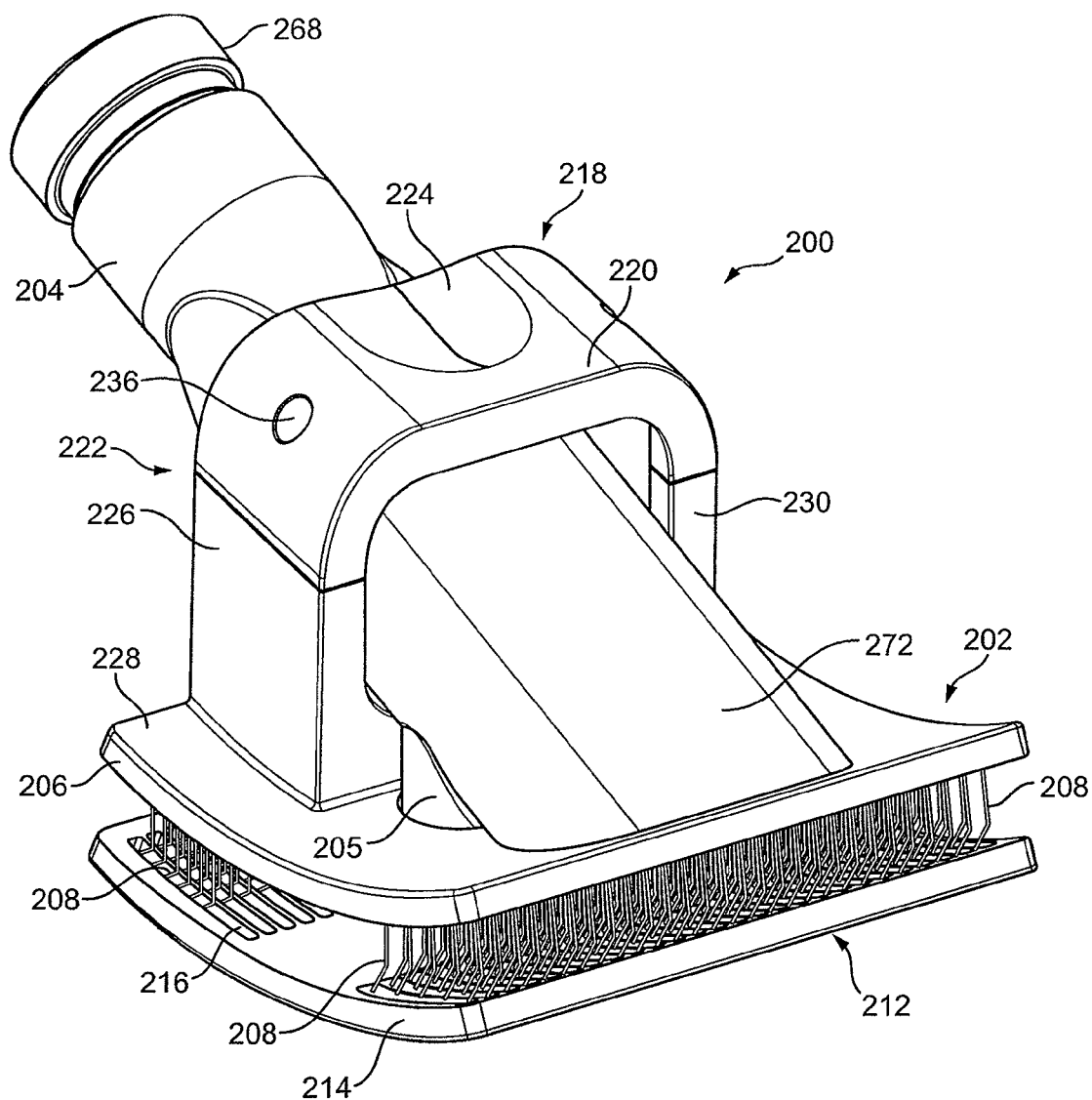
FIG. 16 is a front perspective view, from above, of a third embodiment of a grooming device, with the head of the device in a stowed configuration.
Figure 17:
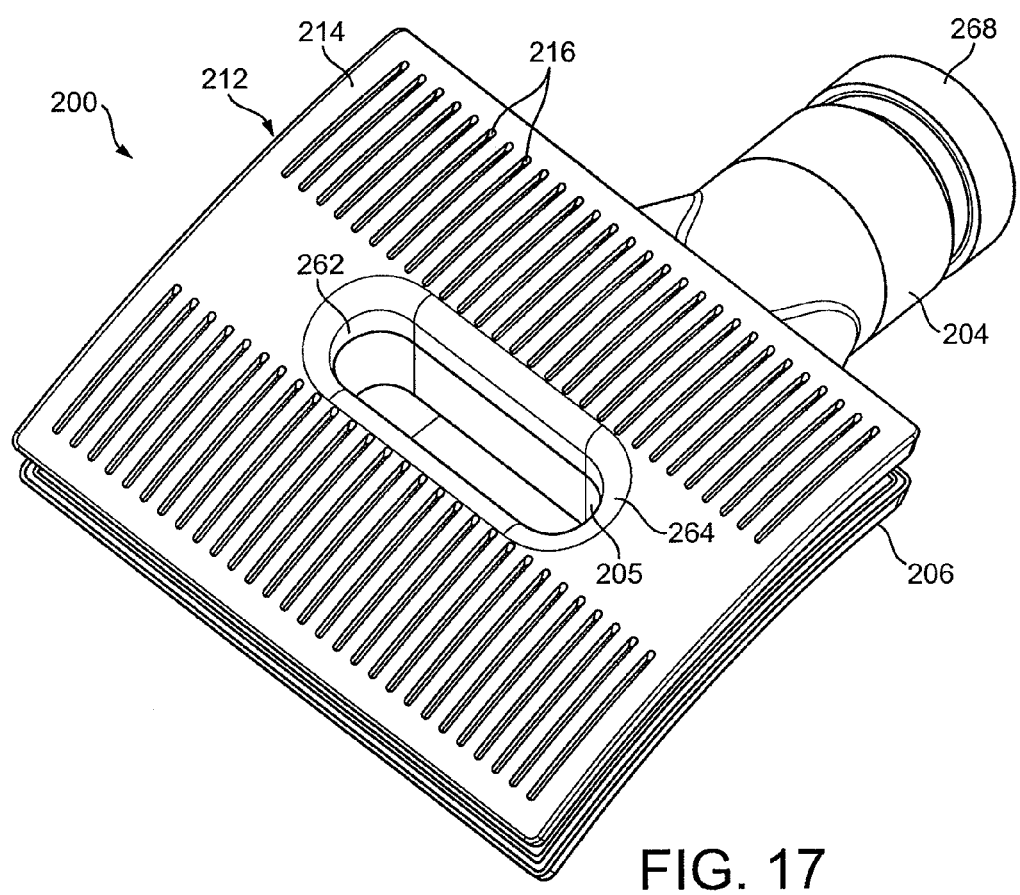
FIG. 17 is a front perspective view, from below, of the grooming device of FIG. 16, with the head in its stowed position.
Figure 18:
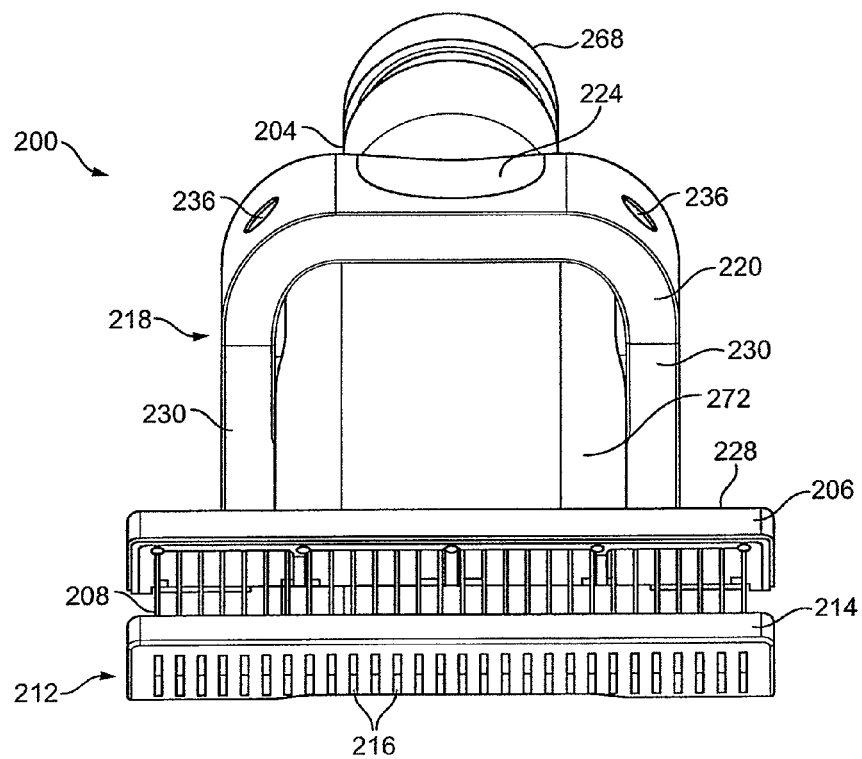
FIG. 18 is a front view of the grooming device of FIG. 16, with the head of the device in its stowed configuration.
Figure 19:
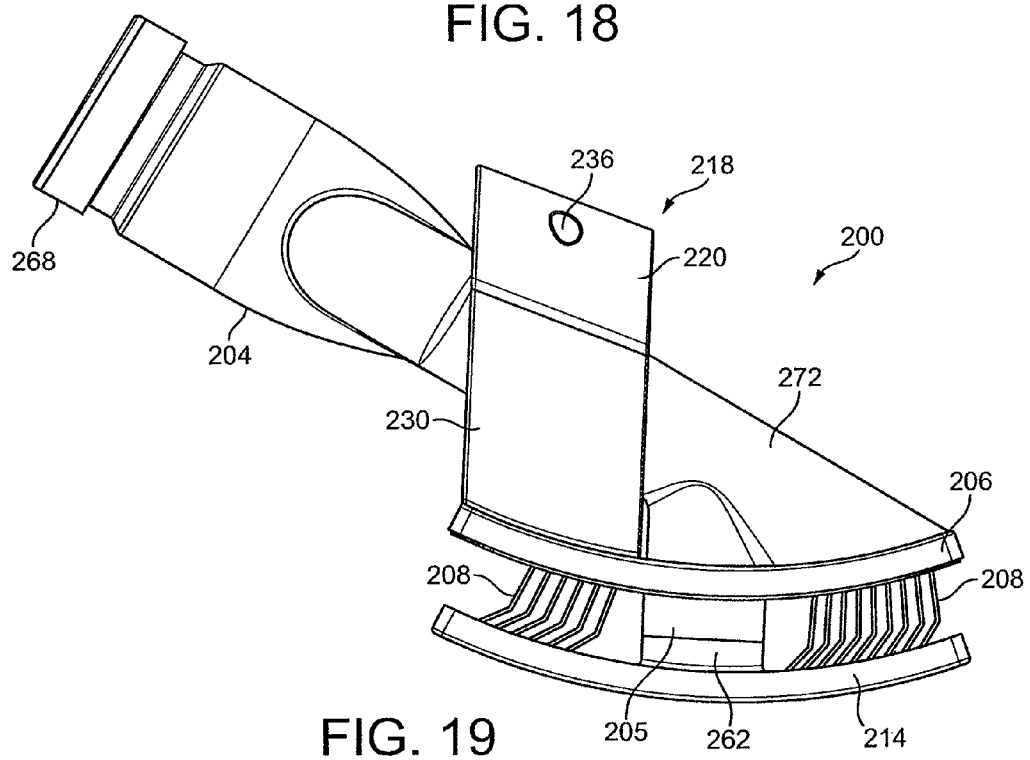
FIG. 19 is a side view of the grooming device of FIG. 16, with the head of the device in its stowed configuration.
Figure 20:
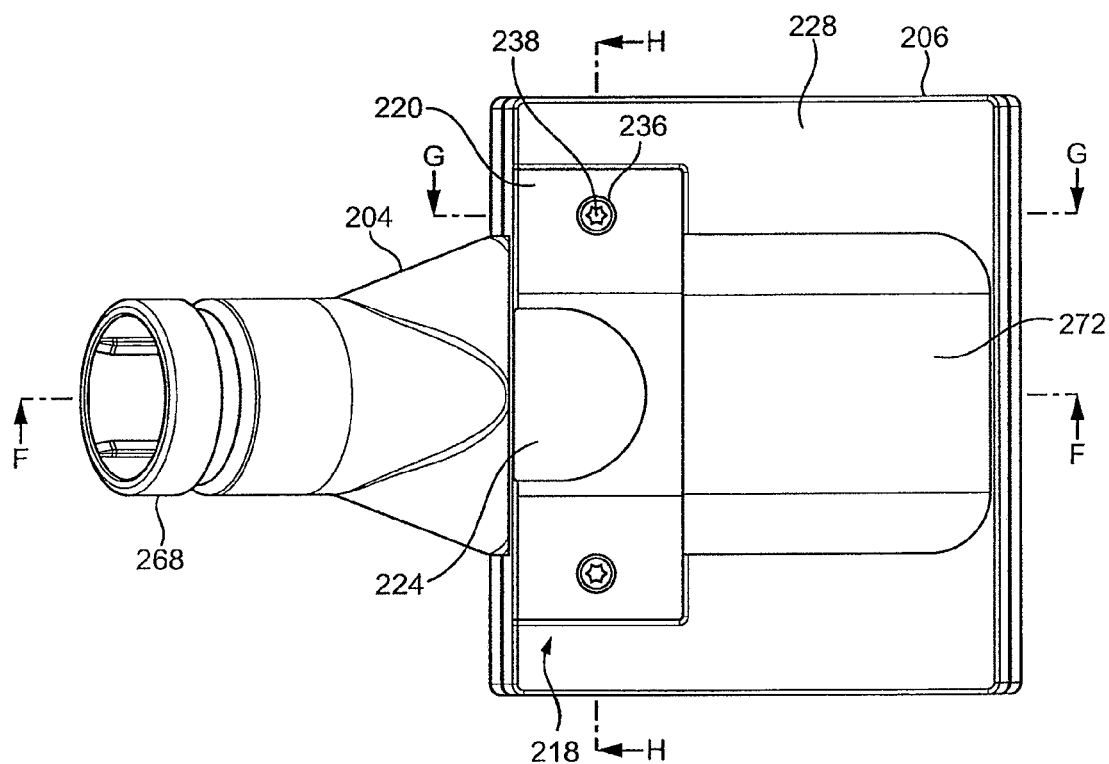
FIG. 20 is a top view of the grooming device of FIG. 16.

The bristle carrier 206 is connected to the actuator 218 so that movement of the actuator 218 relative to the handle 204 causes the bristle carrier 206 to move relative to the bristle cover 212. In this embodiment, the actuator 218 extends about the handle 204. As illustrated in FIGS. 16 and 19, the actuator 218 may be centrally located on the device 200. The actuator 218 comprises an upper section 220 and a lower section 222. The bristle carrier 206 is connected to, and is preferably integral with, the lower section 222 of the actuator 218.

Figure 22:
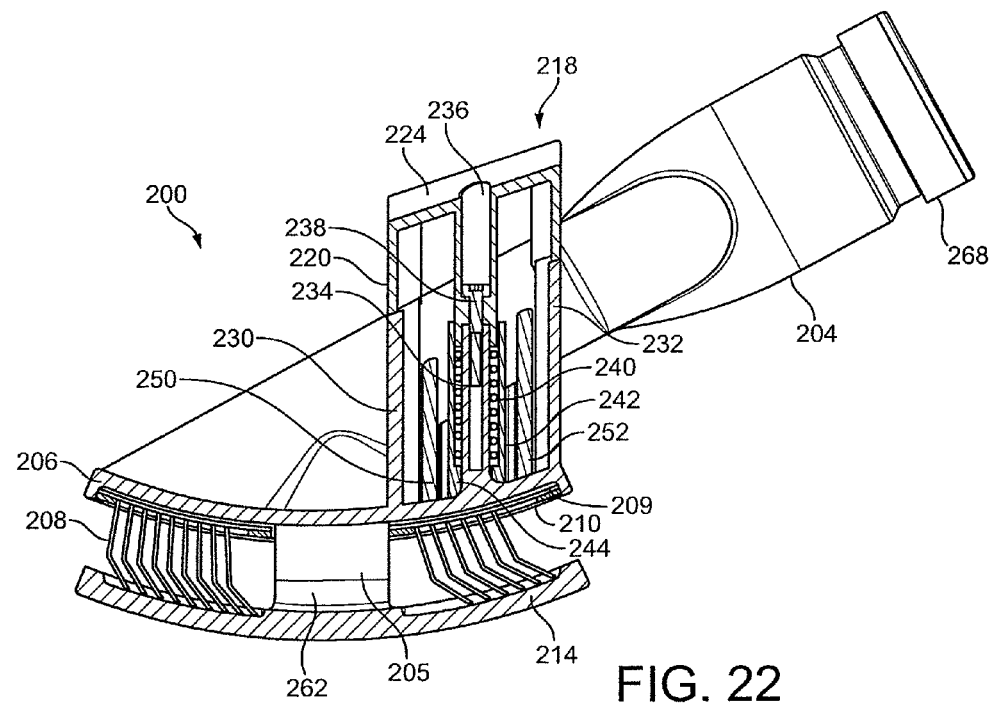
FIG. 22 is a side sectional view taken along line G-G of FIG. 21, with the head of the device in its stowed configuration.
Figure 23:
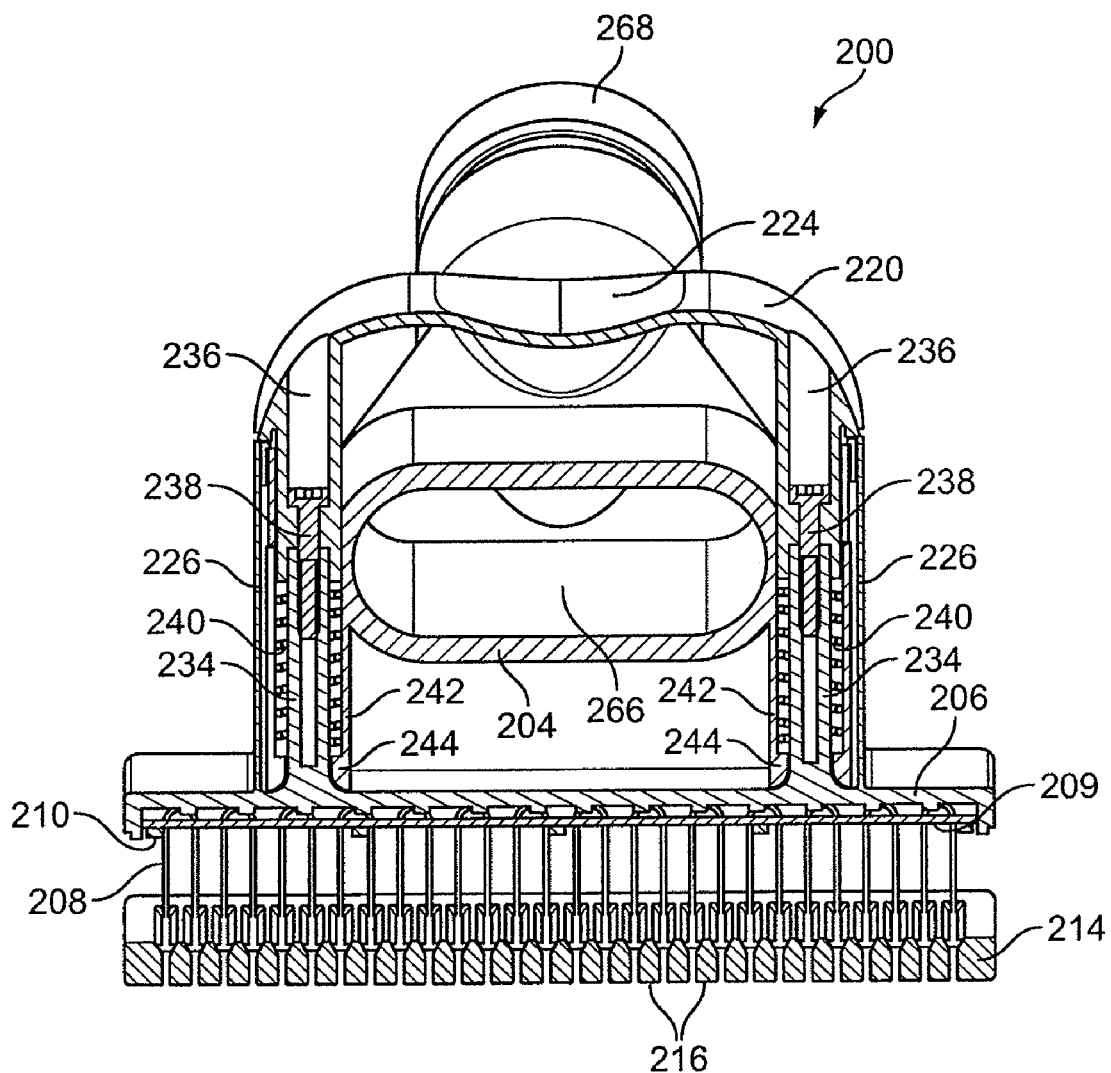
FIG. 23 is a front sectional view taken along line H-H of FIG. 21, with the head of the device in its stowed configuration.
Figure 24:
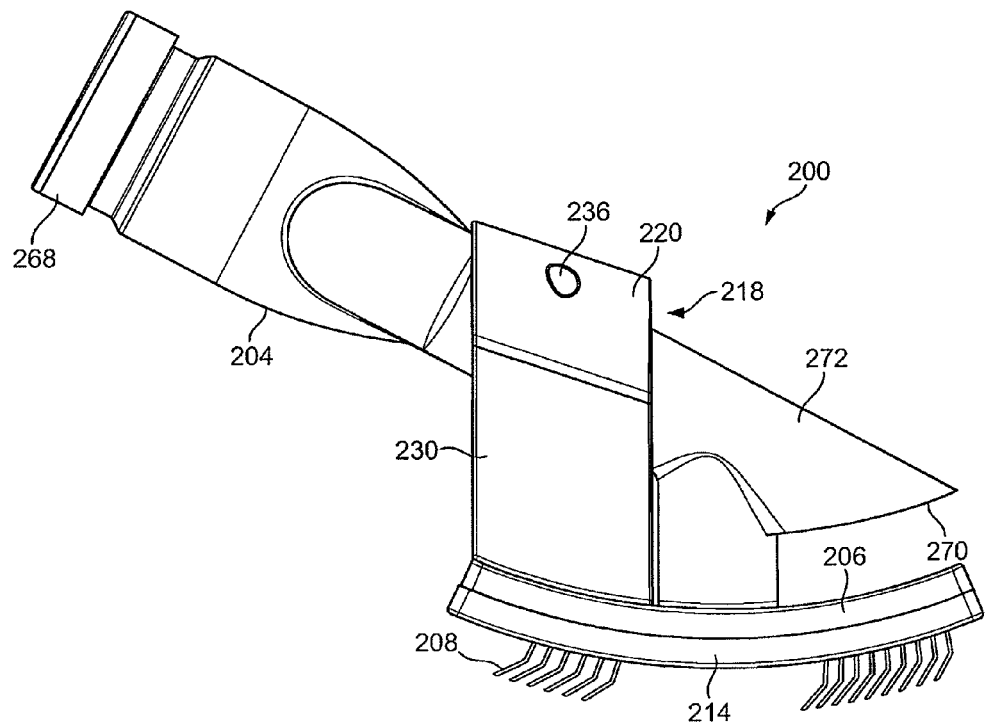
FIG. 24 is a side view of the grooming device of FIG. 16, with the head of the device in its deployed configuration.

The upper section 220 is generally U shaped, and extends over the upper surface of the handle 204. The upper section 220 of the actuator 218 may comprise a recessed portion 224 which is depressed by a user to actuate the movement of the bristle carrier 206 relative to the bristle cover 212. The lower section 222 comprises two side walls 226 upstanding from the upper surface 228 of the bristle carrier 206 and located on opposite sides of the handle 204. The lower section 222 also comprises a U-shaped front wall 230 which is also upstanding from the upper surface 228 of the bristle carrier 206, and which extends between the side walls 226 and beneath the handle 204. With reference also to FIGS. 22 to 24, the lower section 222 also comprises two rear walls 232 which each extend partially inwardly from the rear edge of a respective side wall 226. For the purpose of connecting the upper section 220 to the lower section 222, the lower section 222 further comprises two cylindrical bosses 234. Each boss 234 is also upstanding from, and preferably integral with, the upper surface 228 of the bristle carrier 206. Each boss 234 is located between the handle 204 and a respective side wall 226. The upper section 220 of the actuator 218 is located on the upper ends of the bosses 234 so that each one of a pair of cylindrical recesses 236 formed in the upper section 220 is co-axial with a respective boss 234. The upper section 220 is connected to the lower section 222 using screws 238 which are inserted into the recesses 236 and screwed into the bosses 234.

As in the second embodiment, the bristle carrier 206 is biased away from the base 214 of the bristle cover 212 so that the head 202 is normally in its stowed configuration. In this third embodiment, the grooming device 200 comprises two resilient elements 240 in the form of helical compression springs which urge part of the actuator 218 away from part of the handle 204, so that, in turn, the bristle carrier 206 is urged away from the base 214 of the bristle cover 212. Returning to FIGS. 22 and 23, the handle 204 comprises a pair of cylindrical shafts 242 which are each connected to, and preferably integral with, a respective side of the handle 204. Each shaft 242 is arranged to surround a respective boss 234 of the lower section 222 of the actuator 218. The lower end of each shaft 242 is shaped to define a seat 244 upon which a resilient element 240 is located prior to the connection of the upper section 220 of the actuator 218 to the lower section 222. When the upper section 220 is located on the lower section 222, the upper end of each resilient element 240 engages a respective part of the upper section 220 so as to urge the upper section 220 of the actuator 218 away from the handle 204.

As illustrated in FIGS. 16 to 23, when the grooming device 200 is not in use the biasing force of the resilient elements 240 retains the head 202 of the grooming device 100 in its stowed configuration. The movement of the upper section 220 of the actuator 218 away from the handle 204 may be limited by the engagement between the upper surface 228 of the bristle carrier 206, which moves with the actuator 218, and the lower surfaces of two fins 250, 252 which each depend downwardly from the lower surface of the handle 204.

Figure 25:
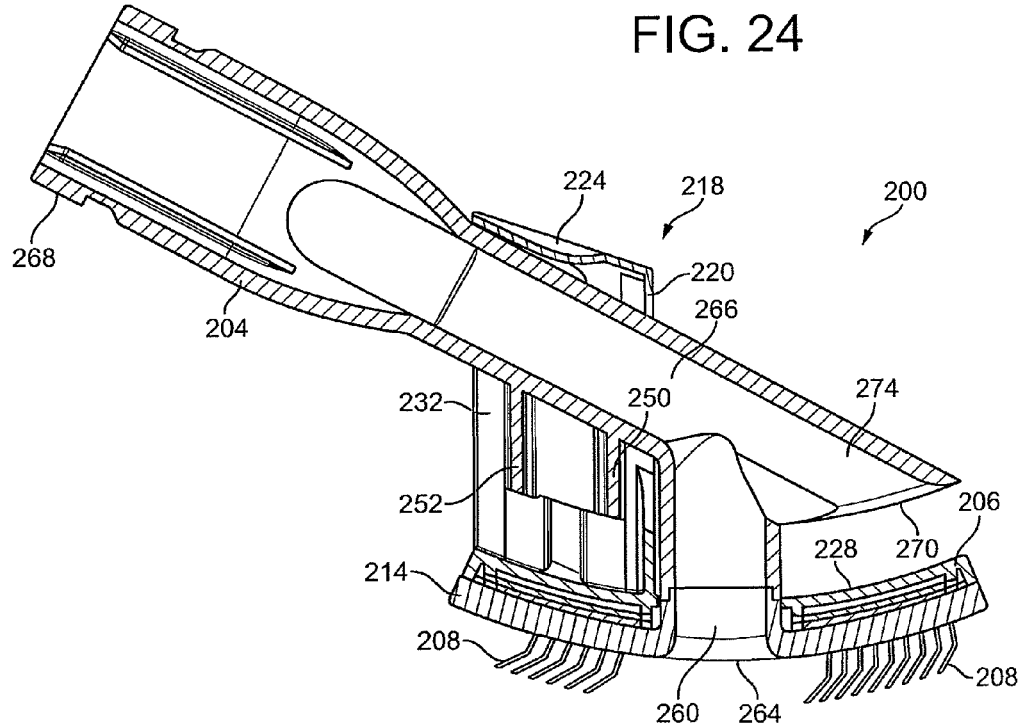
FIG. 25 is a side sectional view taken along line F-F of FIG. 21, with the head of the device in its deployed configuration.
Figure 26:
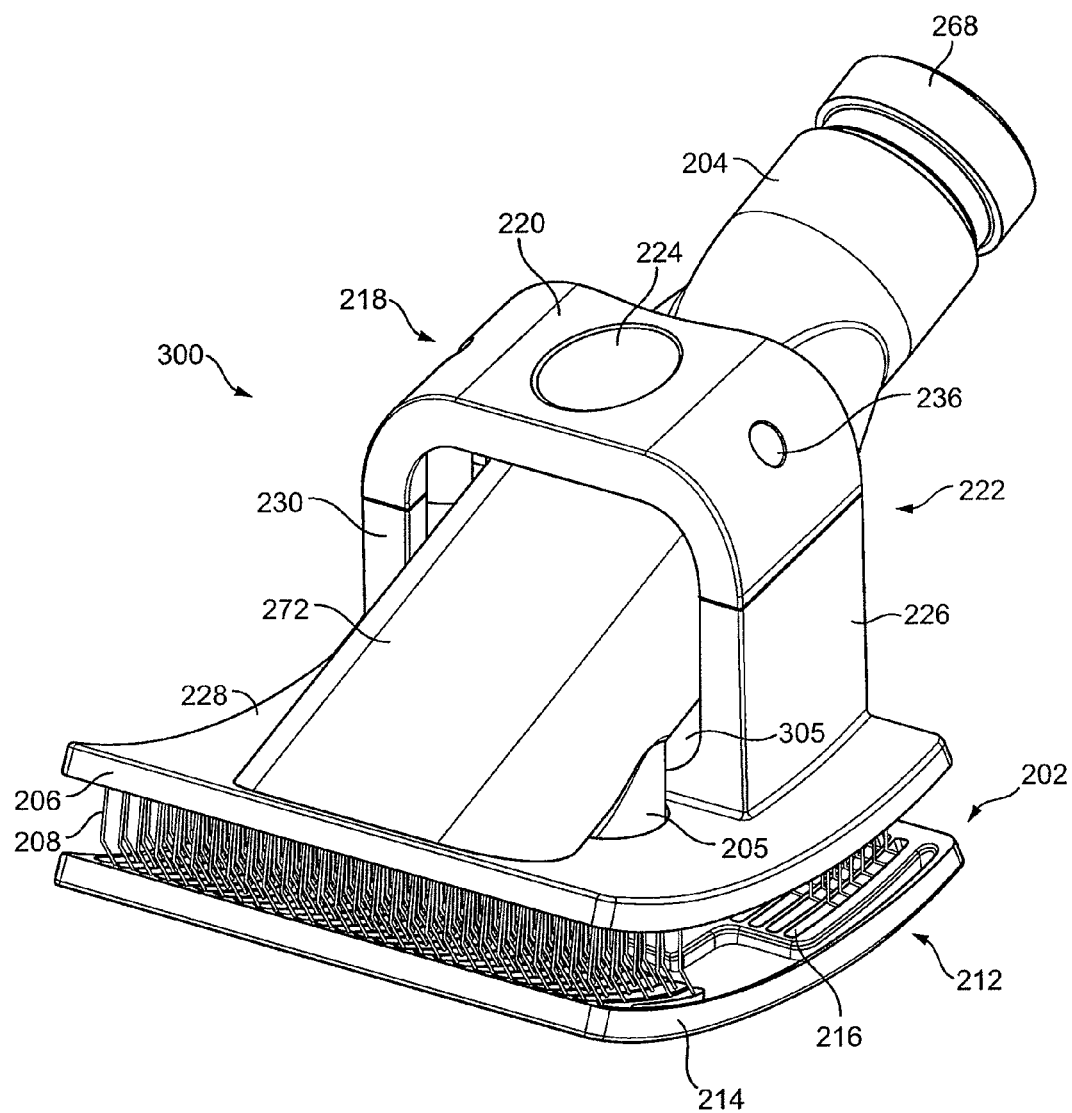
FIG. 26 is a front perspective view, from above, of a fourth embodiment of a grooming device, with the head of the device in a stowed configuration.

When the grooming device 200 is held by the user, the recessed portion 224 of the upper section 220 of the actuator 218 is engaged by the thumb of the hand of the user and the handle 204 is supported by the fingers of that hand of the user. The actuator 218 is moved relative to the handle 204 by the user pressing the upper section 220 of the actuator 218 towards the upper surface of the handle 204 against the biasing force of the resilient elements 240. As illustrated in FIGS. 24 and 25, the movement of the actuator 218 causes the bristle carrier 206 to be pushed towards the base 214 of the bristle cover 212, resulting in the protrusion of the bristles 208 through the apertures 216 of the bristle cover 212.

The grooming device 200 comprises a conduit for conveying an air flow away from the head 202 of the grooming device 200. A first section 260 of the conduit is defined by a duct 262 extending upwardly from a central portion from the base 214 of the bristle cover 212 and through an aperture formed in the bristle carrier 206. The lower end of the duct 262 defines a first suction opening 264 in the base 214 of the bristle cover 212. The upper end of the duct 262 is connected to the first end 205 of the handle 204. A second section 266 of the conduit passes through the handle 204, from the first end 205 of the handle 204 to a second end 268 of the handle 204 which is remote from the head 202. The second end 268 of the handle 204 is connectable to an appliance for generating the air flow, such as a vacuum cleaner. As in the first and second embodiments, the second end 268 of the handle 204 is shaped to receive a connector attached to a hose for conveying the air flow to the appliance.

The grooming device 200 also comprises means for varying the air flow into the conduit from the first suction opening 264. In this embodiment an air bleed in the form of a second suction opening 270 formed in a front portion 272 of the handle 204 for selectively admitting air into the conduit. The front portion 272 of the handle 204 is located forward from the first end 205 of the handle 204, and defines a third section 274 of the conduit. The third section 274 is aligned with a major part of the second section 266 of the conduit. The second suction opening 270 is located at the end of the front portion 272 of the handle 204 so as to face the upper surface 228 of the bristle carrier 206. The peripheral surface of the second suction opening 270 has a curvature which is substantially the same as that of the upper surface 228 of the bristle carrier 206.

Figure 21:
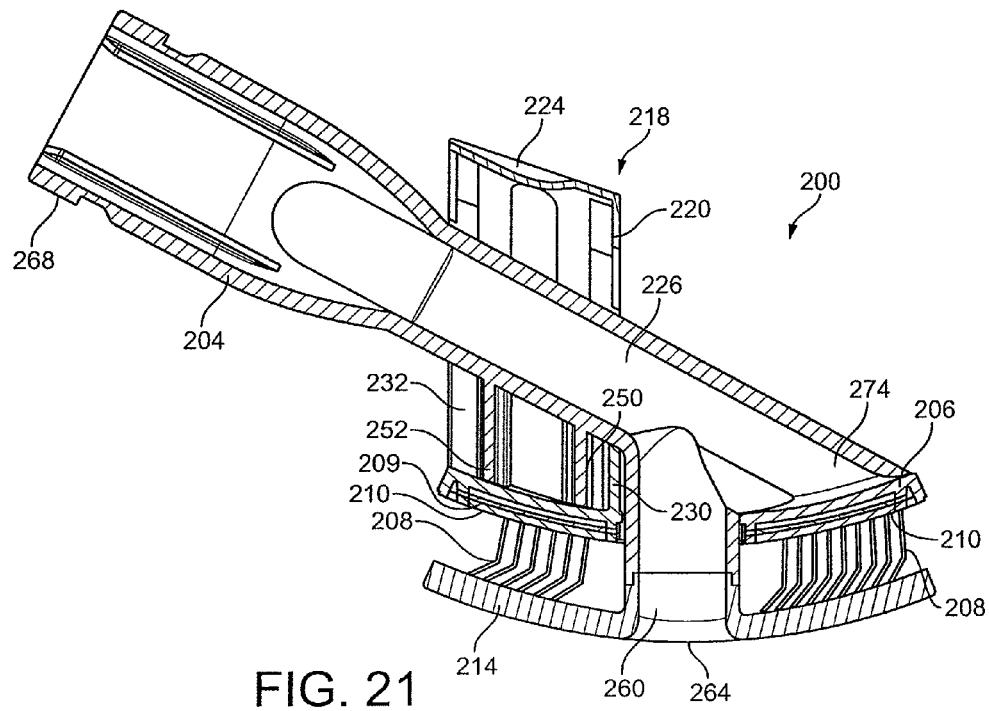
FIG. 21 is a side sectional view taken along line F-F of FIG. 21, with the head of the device in its stowed configuration.

In this embodiment, the air flow through the second suction opening 270 is varied by the bristle carrier 206 as it is moved relative to the bristle cover 214. As illustrated in FIGS. 21 and 22, when the head 202 is in its stowed configuration the peripheral surface of the second suction opening 270 is engaged by the upper surface 228 of the bristle carrier 206 so that the second suction opening 270 is substantially closed. This can also serve to restrict movement of the upper section 220 of the actuator 218 away from the handle 204. If desired, however, the peripheral surface of the second suction opening 270 may be spaced from the upper surface 228 of the bristle carrier 206 so that the flow of air into the second suction opening 270 is throttled by the bristle carrier 206. As illustrated in FIGS. 24 and 25, when the head 202 is in its deployed configuration the second suction opening 270 is spaced from the bristle carrier 206.

The operation of the grooming device 200 is similar to that of the grooming device 100. In use, the user connects the second end 268 of the handle 204 to a vacuum cleaner, and switches on the appliance to create an air flow through the conduit. The user then grips the handle 204 of the grooming device 200 and, using the thumb of the hand holding the grooming device 200, presses the upper section 220 of the actuator 218 towards the handle 204. This causes the head 202 to move to its deployed configuration in which the bristles 208 protrude from the bristle cover 212 through the apertures 216. While continuing to depress the actuator 218, the user may groom a pet by drawing the bristles 208 through the coat of the pet. As the second suction opening 270 is open when the head 202 is in its deployed configuration, a first part of the air flow generated by the vacuum cleaner enters the conduit through the first suction opening 264. This enables loose hair, dirt and other matter to be entrained within the air flow passing through the first suction opening 264. A second part of the air flow generated by the vacuum cleaner enters the conduit through the second suction opening 270. This enables airborne hair and other matter to the entrained within the air flow passing the second suction opening 270. The relatively low air flow entering the conduit through the first suction opening 264 prevents the head 202 from being pushed down against the skin of the pet during the grooming operation.

During grooming, hairs will be collected between the bristles 208 of the grooming device 10. In order to remove these hairs from the grooming device 200, the user releases the actuator 218 by reducing the pressure applied to the upper section 220 of the actuator 218. This enables the resilient elements 240 to urge the upper section 220 of the actuator 218 away from the handle 204. This in turn causes the bristles 208 to retract through the apertures 216 in the bristle cover 212 as the head 202 moves to its stowed configuration, thereby releasing the collected hairs from the bristles 208. The movement of the actuator 218 causes the bristle carrier 206 to close the second suction opening 270 to increase the amount of the air flow which enters the conduit through the first suction opening 264. This causes the collected hairs to be drawn into the conduit through the first suction opening 264 and carried away from the head 202 of the grooming device 200 without the user having to dislodge or other come into physical contact with the collected hairs.

In order to continue grooming, the user simply depresses the upper section 220 of the actuator 218 again, resulting in the protrusion of the bristles 208 from the bristle cover 212. The user can periodically reduce the pressure applied to the upper section 220 of the actuator 218 to enable collected hairs to be removed from the head 202.

FIGS. 26 to 31 illustrate a fourth embodiment of a grooming device 300, which is also in the form of an attachment for a vacuum cleaning appliance. The grooming device 300 is generally the same as the grooming device 200, with the exception that the fins 250, 252 of the handle 204 have been removed and replaced by a valve arrangement 302 for admitting air into the conduit in the event that there is a blockage of one or both of the first suction opening 264 and the second suction opening 270, or a blockage immediately downstream from one or both of these suction openings 264, 270, during use of the device 300.

Figure 27:
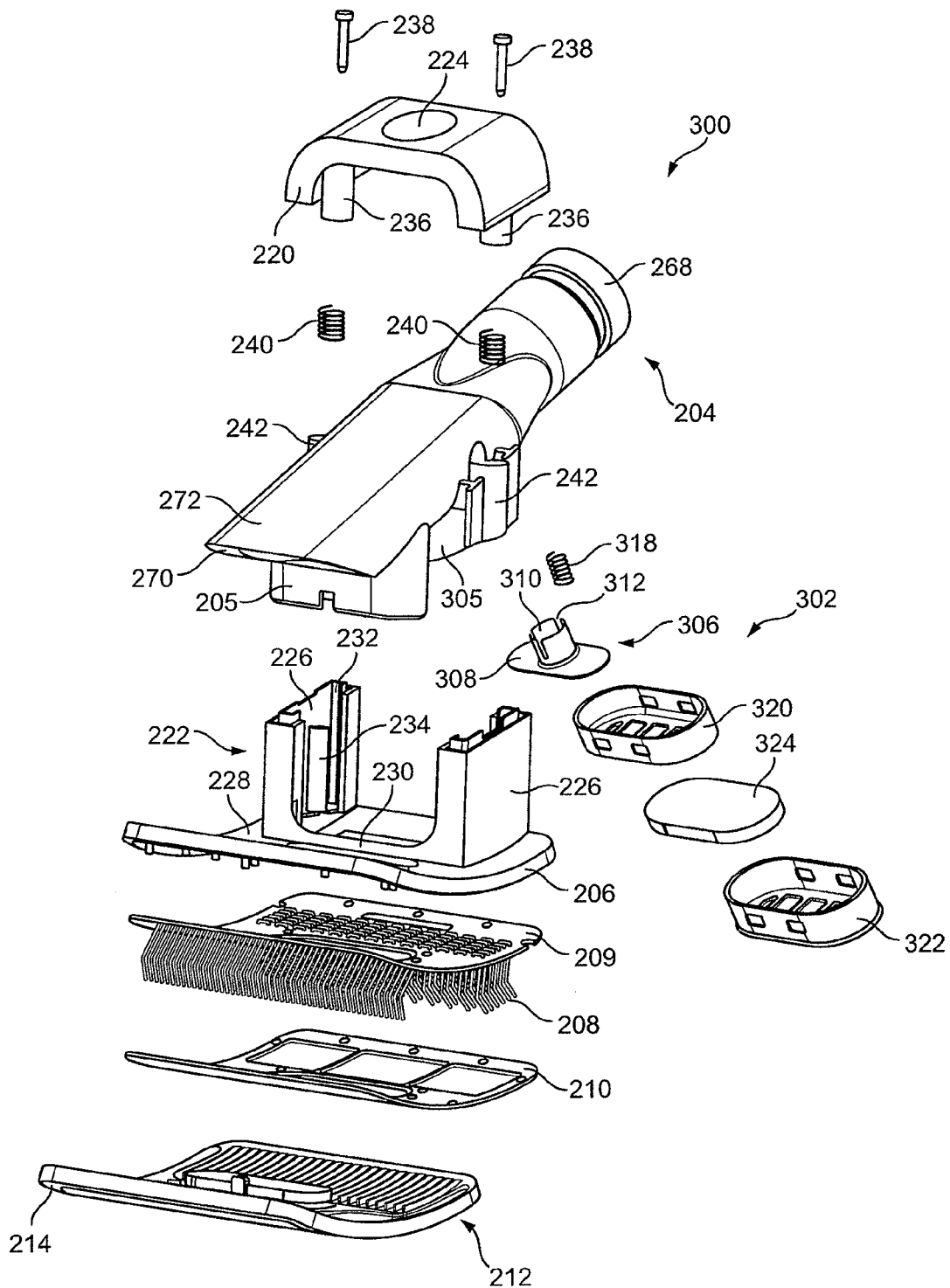
FIG. 27 is an exploded view of the grooming device of FIG. 26.
Figure 28:
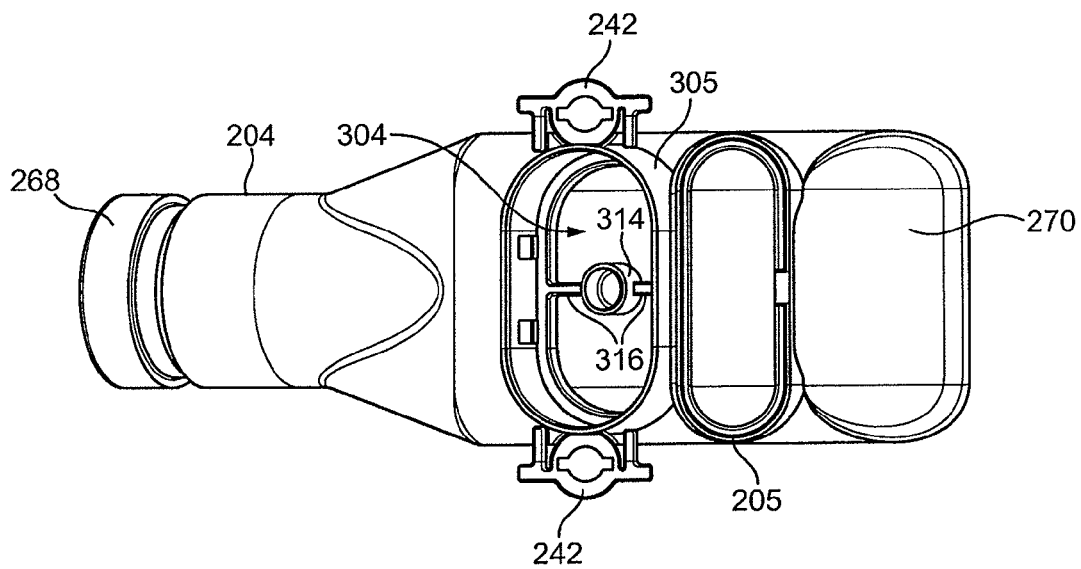
FIG. 28 is a bottom view of the handle of the grooming device of FIG. 26.
Figure 30:
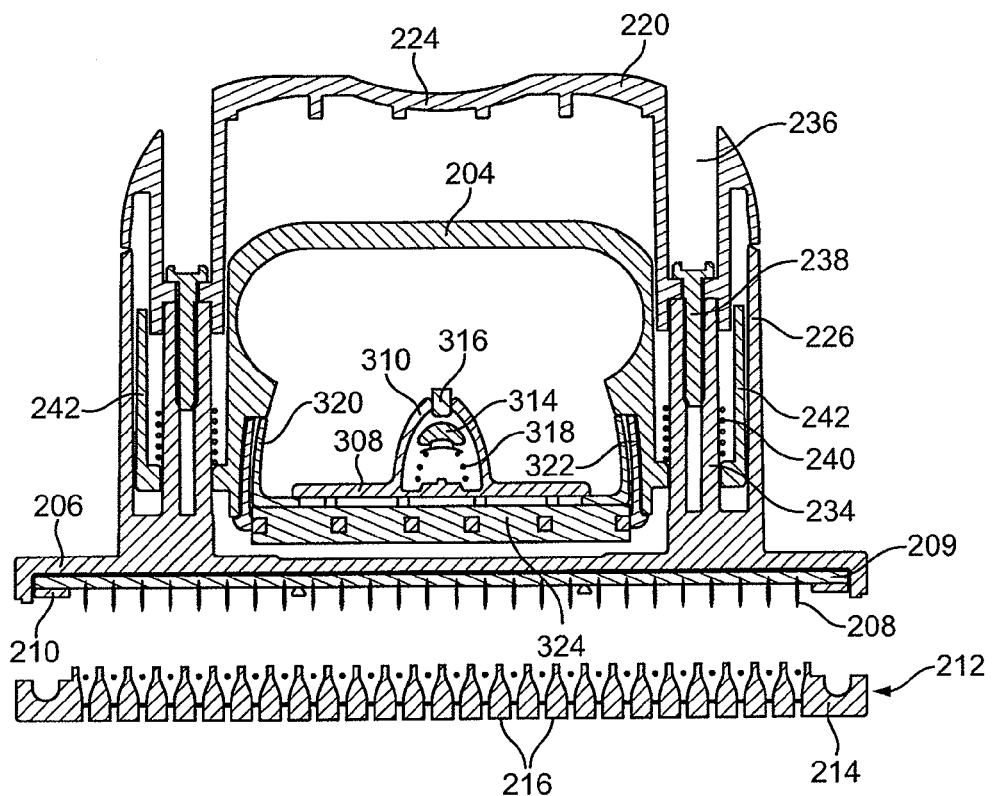
FIG. 30 is a section, taken along line B-B of FIG. 29, of the grooming device, with the head of the device in its stowed configuration and a valve of a valve arrangement in a closed position.
Figure 29:
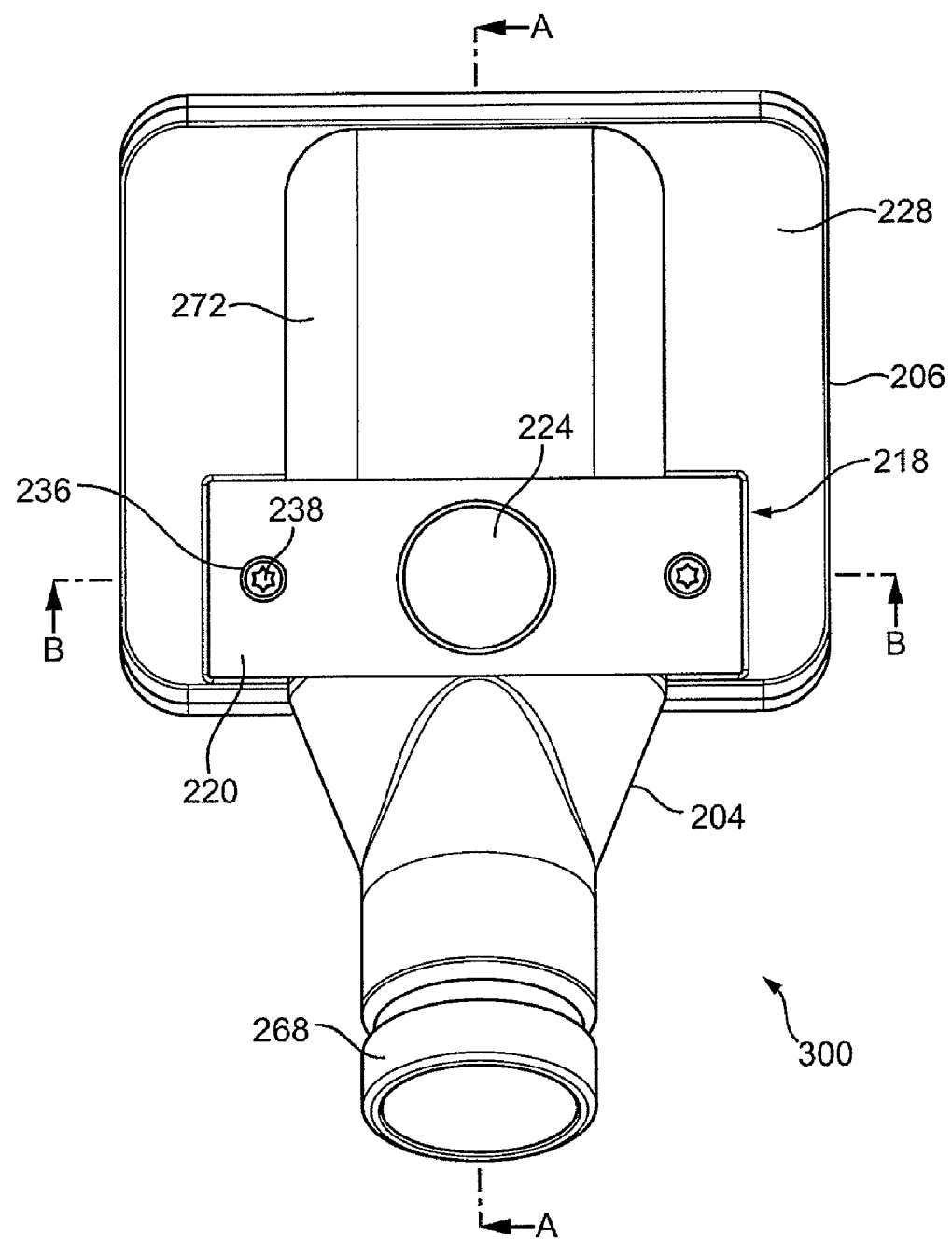
FIG. 29 is a top view of the grooming device of FIG. 26.

The valve arrangement 302 comprises an air bleed 304 located in a portion of the handle 204 located downstream from the junction between the second section 266 and the third section 274 of the conduit. With reference to FIG. 28, in this embodiment the air bleed 304 is located on a lower surface of the handle 204, and is generally rectangular in shape. The air bleed 304 is surrounded by an annular wall 305 depending from the lower surface of the handle 204. Turning to FIGS. 27 and 30, the valve arrangement 302 further comprises a valve 306 for controlling the air flow through the air bleed 304.

The valve 306 comprises a base 308 and a tubular body 310 having a pair of diametrically opposed slots 312. The body 310 is located over a cylindrical boss 314 located generally in the centre of the air bleed 304, and which is supported by two arms 316 extending across the air bleed 304. The slots 312 of the valve 308 are aligned with the arms 316 spanning the air bleed 304 so that each arm 316 extends through a respective slot 310. A resilient element, in this embodiment in the form of a helical spring 318, is located within the body 310 of the valve 306 so that one end of the spring 318 engages the boss 314 and the other end of the spring 318 engages the base 308 so as to urge the base 308 of the valve 306 away from the boss 314.

The valve arrangement 302 further comprises a valve seat against which the base 308 of the valve 306 is urged by the spring 318. The valve seat is in the form of a generally rectangular inner frame 320 having a perimeter against which the base 308 of the valve 306 is urged by the spring 318. The inner frame 320 is located within a generally rectangular outer frame 322 which is attached to the inner periphery of the annular wall 305, for example by a snap-fit connection. The base 308 of the valve 306 is exposed to the ambient atmosphere through the inner frame 320 and the outer frame 322. A foam member 324 may be retained between the inner frame 320 and the outer frame 322 to inhibit the ingress of dirt into the conduit through the air bleed 304. The outer frame 322, or the foam member 324, also serves the same function of the fins 250, 252 insofar as the movement of the upper section 220 of the actuator 218 away from the handle 204 is limited by the engagement between the upper surface 228 of the bristle carrier 206 and the lower surface of outer frame 322.

Figure 31A:
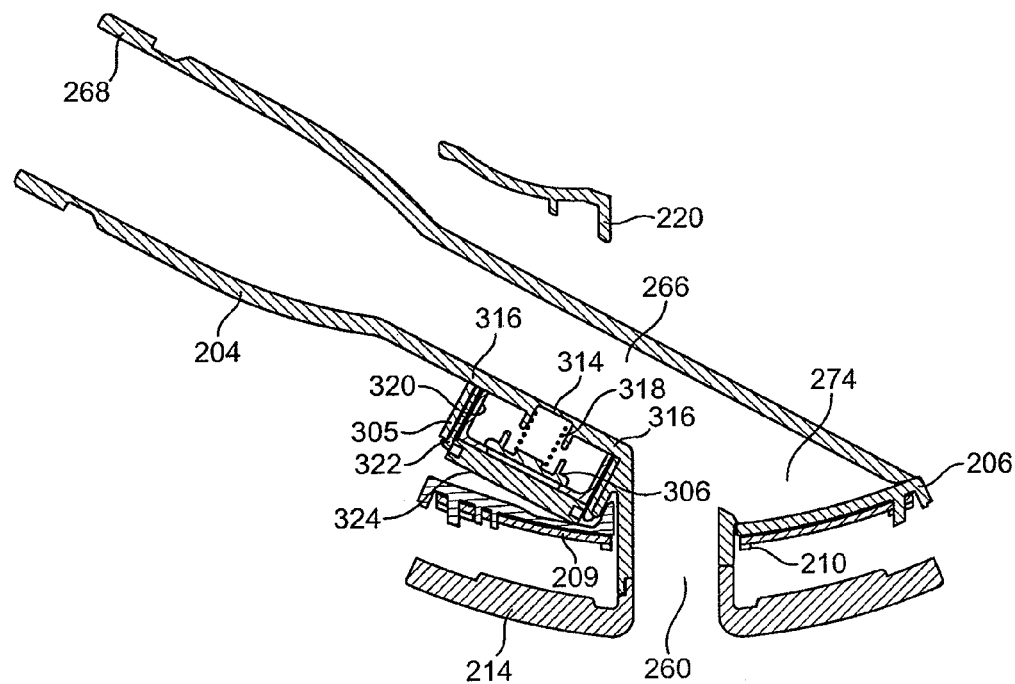
FIG. 31(a) is a section, taken along line A-A of FIG. 29, of the grooming device, with the head of the device in its stowed configuration and a valve of a valve arrangement in a closed position.
Figure 31B:
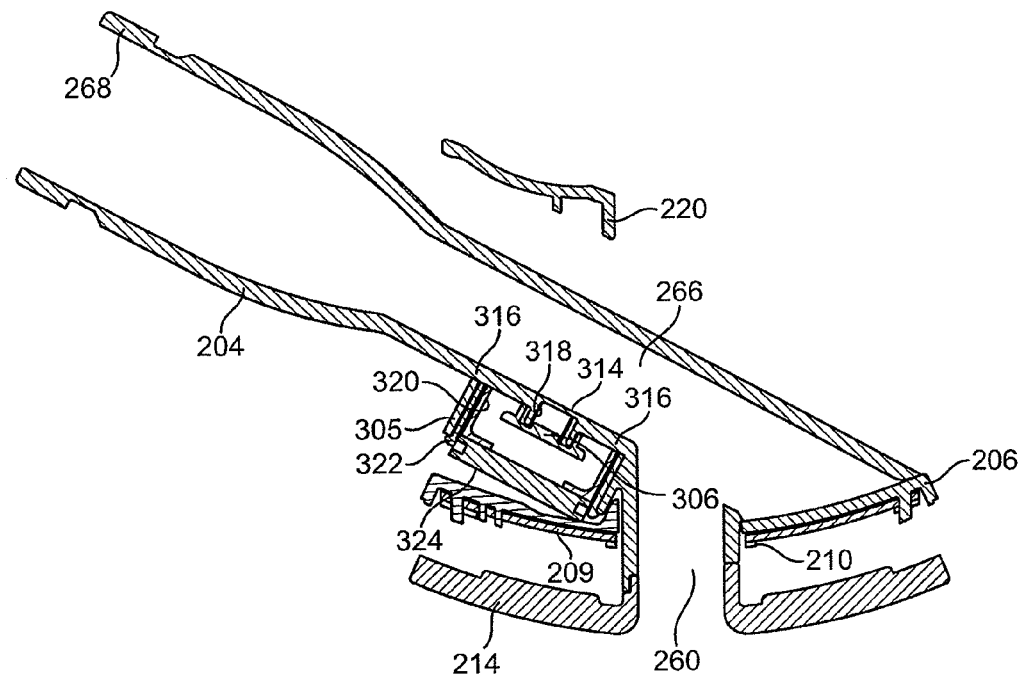
FIG. 31(b) is a section, taken along line A-A of FIG. 29, of the grooming device, with the head of the device in its stowed configuration and a valve of a valve arrangement in an open position.

During normal use of the device 300, the valve 306 is in a closed position, as illustrated in FIGS. 30 and 31($a$) in which the base 308 of the valve 306 is urged against the inner frame 320 by the spring 318 to inhibit the flow of air into the conduit through the air bleed 304. While there is a force acting on the base 308 of the valve 306 due to the difference in the air pressure within the conduit and the air pressure of the ambient atmosphere, this force is insufficient to overcome the elastic force of the spring 318 so that the valve 306 remains in its closed position when the head 202 is in both its stowed and deployed configurations. In the event of a blockage within the conduit upstream of the air bleed 304, the air pressure within the conduit downstream from the blockage may decrease, which may in turn increase the pressure differential between the air in the conduit and the ambient atmosphere. This increases the force acting on the base 308 of the valve 306. The elastic force of the spring 318 is selected so that the increased force acting on the base 308 of the valve 306 is able to overcome the biasing force of the spring 318, which results in the valve 306 moving away from the valve seat to an open position, as illustrated in FIG. 31($b$), to allow air to pass into the conduit through the air bleed 304. This reduces the suction force acting at the source of the blockage in the conduit, which can allow the blockage to be removed without having to switch off the vacuum cleaner to which the device 300 is attached.

The invention claimed is:

1. An attachment for a vacuum cleaning appliance, comprising:

a head comprising a bristle carrier and a bristle cover, the bristle carrier comprising a plurality of bristles and the bristle cover comprising a plurality of apertures;

a handle connected to the head;

a conduit connectable to a vacuum cleaning appliance for conveying an air flow towards the appliance;

an actuator for effecting relative movement between the bristle carrier and the bristle cover between a deployed configuration, in which the bristles protrude from the bristle cover through the apertures, and a stowed configuration, in which the bristles are retracted relative to the bristle cover to dislodge hair collected between the bristles;

wherein the head comprises a first suction opening of the conduit and the handle comprises a second suction opening of the conduit; and a device for varying the air flow through the suction openings depending on the configuration of the bristle carrier and the bristle cover, said device for varying the air flow being configured to close at least part of the second suction opening when the bristle carrier and the bristle cover are in the stowed configuration.

2. The attachment of claim 1, wherein the bristle carrier is connected to the actuator.

3. The attachment of claim 1, wherein the actuator is moveable relative to the handle to effect said relative movement.

4. The attachment of claim 1, wherein the actuator is slidably moveable relative to the handle.

5. The attachment of claim 1, wherein said relative movement is effected by pressing the actuator towards the handle.

6. The attachment of claim 1, wherein the actuator comprises the device for varying the air flow.

7. The attachment of claim 1, wherein the head comprises the device for varying the air flow.

8. The attachment of claim 7, wherein the device for varying the air flow is configured to cover at least part of the second suction opening when the bristle carrier and the bristle cover are in the stowed configuration.

9. The attachment of claim 1, wherein the second suction opening is located in a front surface of the handle.

10. The attachment of claim 1, wherein the conduit comprises a first section for conveying the air flow away from the first suction opening, and a second section for conveying the air flow from the first section towards an appliance connected to the handle.

11. The attachment of claim 10, wherein the second suction opening is located in the second section of the conduit.

12. The attachment of claim 10, wherein the conduit comprises a third section for conveying the air flow from the second suction opening to the second section of the conduit.

13. The attachment of claim 12, wherein the third section is linearly aligned with the second section.

14. The attachment of claim 12, wherein the second suction opening is located at the end of the third section of the conduit.

15. The attachment of claim 12, wherein the second suction opening faces at least part of the bristle carrier.

16. The attachment of claim 1, wherein the bristle carrier comprises a plurality of rows of bristles, and the bristle cover comprises a plurality of rows of apertures.

17. The attachment of claim 1, in the form of a pet grooming device.

* * * * *